US009159294B2

(12) United States Patent
Le Grand et al.

(10) Patent No.: US 9,159,294 B2
(45) Date of Patent: Oct. 13, 2015

(54) BUTTONLESS DISPLAY ACTIVATION

(71) Applicant: Google Inc., Mountain View, CA (US)

(72) Inventors: Etienne Le Grand, Mountain View, CA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/230,880

(22) Filed: Mar. 31, 2014

(65) Prior Publication Data

US 2015/0221278 A1    Aug. 6, 2015

Related U.S. Application Data

(60) Provisional application No. 61/934,153, filed on Jan. 31, 2014.

(51) Int. Cl.
*G09G 5/00* (2006.01)
*G06F 3/038* (2013.01)
(Continued)

(52) U.S. Cl.
CPC ............. *G09G 5/003* (2013.01); *G06F 1/3215* (2013.01); *G06F 1/3265* (2013.01); *G06F 1/3278* (2013.01); *G06F 1/3287* (2013.01); *G06F 3/01* (2013.01); *G09G 2330/021* (2013.01)

(58) Field of Classification Search
CPC ... G06F 1/3234; G06F 1/3246; G06F 1/3265; G06F 1/3287
USPC .................................................. 345/156–184
See application file for complete search history.

(56) References Cited

U.S. PATENT DOCUMENTS 6,098,118 A   8/2000 Ellenby et al.
6,452,494 B1  9/2002 Harrison
(Continued)

FOREIGN PATENT DOCUMENTS

EP   1785808 A1   5/2007
EP   2336727 A1   6/2011
(Continued)

OTHER PUBLICATIONS

Data Sheet "BMA 220 Digital, triaxial acceleration sensor," Bosch Sensortec, Document revision 1.15, Document release date Aug. 23, 2011, downloaded from http://ae-bst.resource.bosch.com/media/products/dokumente/bma220/bst-bma220-ds003-08.pdf,63 pages.
(Continued)

*Primary Examiner* — Kathy Wang-Hurst
*Assistant Examiner* — David Tung
(74) *Attorney, Agent, or Firm* — Shumaker & Sieffert, P.A.

(57) ABSTRACT

In one example, a method includes determining, by a first motion module of a computing device and based on first motion data measured by a first motion sensor at a first time, that the mobile computing device has moved, wherein a display operatively coupled to the computing device is deactivated at the first time; responsive to determining that the computing device has moved, activating a second motion module; determining, by the second motion module, second motion data measured by a second motion sensor, wherein determining the second motion data uses a greater quantity of power than determining the first motion data; determining a statistic of a group of statistics based on the second motion data; and responsive to determining that at least one of the group of statistics satisfies a threshold, activating the display.

27 Claims, 17 Drawing Sheets

(51) Int. Cl.
*G06F 3/01* (2006.01)
*G06F 1/32* (2006.01)

(56) References Cited

U.S. PATENT DOCUMENTS

| | | | |
|---|---|---|---|
| 6,529,144 B1 | 3/2003 | Nilsen et al. | |
| 7,159,194 B2 | 1/2007 | Wong et al. | |
| 7,498,951 B2 | 3/2009 | Wardimon | |
| 7,558,600 B2 | 7/2009 | Kang | |
| 7,606,552 B2 * | 10/2009 | Orr et al. | 455/343.1 |
| 7,656,393 B2 | 2/2010 | King et al. | |
| 7,688,306 B2 | 3/2010 | Wehrenberg et al. | |
| 7,826,874 B2 | 11/2010 | Fyke | |
| 8,065,508 B2 | 11/2011 | Rubin et al. | |
| 8,170,621 B1 | 5/2012 | Lockwood | |
| 8,344,998 B2 | 1/2013 | Fitzgerald et al. | |
| 8,560,004 B1 | 10/2013 | Tsvetkov et al. | |
| 8,976,063 B1 | 3/2015 | Hawkins et al. | |
| 2003/0103091 A1 | 6/2003 | Wong et al. | |
| 2005/0088522 A1 | 4/2005 | Creviston | |
| 2005/0234676 A1 | 10/2005 | Shibayama | |
| 2006/0161377 A1 | 7/2006 | Rakkola et al. | |
| 2006/0204232 A1 | 9/2006 | Weinberg et al. | |
| 2007/0004451 A1 | 1/2007 | Anderson | |
| 2007/0010940 A1 | 1/2007 | Tan et al. | |
| 2007/0036348 A1 | 2/2007 | Orr | |
| 2007/0075965 A1 | 4/2007 | Huppi et al. | |
| 2007/0156364 A1 | 7/2007 | Rothkopf | |
| 2007/0161410 A1 | 7/2007 | Huang et al. | |
| 2007/0259685 A1 | 11/2007 | Engblom et al. | |
| 2008/0140868 A1 | 6/2008 | Kalayjian et al. | |
| 2008/0234935 A1 * | 9/2008 | Wolf et al. | 701/216 |
| 2009/0278738 A1 | 11/2009 | Gopinath | |
| 2010/0079395 A1 | 4/2010 | Kim et al. | |
| 2010/0090564 A1 | 4/2010 | Oh et al. | |
| 2010/0181988 A1 | 7/2010 | Hong et al. | |
| 2010/0235667 A1 * | 9/2010 | Mucignat et al. | 713/323 |
| 2010/0302028 A1 | 12/2010 | Desai et al. | |
| 2010/0313050 A1 | 12/2010 | Harrat et al. | |
| 2011/0070864 A1 | 3/2011 | Karam et al. | |
| 2011/0093729 A1 | 4/2011 | Mucignat et al. | |
| 2011/0167391 A1 | 7/2011 | Momeyer et al. | |
| 2011/0251892 A1 | 10/2011 | Laracey | |
| 2011/0312349 A1 * | 12/2011 | Forutanpour et al. | 455/466 |
| 2012/0075451 A1 | 3/2012 | Raynor | |
| 2012/0154292 A1 | 6/2012 | Zhao et al. | |
| 2012/0188376 A1 | 7/2012 | Chatow et al. | |
| 2012/0235790 A1 | 9/2012 | Zhao et al. | |
| 2012/0254100 A1 | 10/2012 | Grokop et al. | |
| 2012/0278744 A1 | 11/2012 | Kozitsyn et al. | |
| 2012/0287035 A1 | 11/2012 | Valko et al. | |
| 2012/0290252 A1 | 11/2012 | Abraham | |
| 2012/0297226 A1 | 11/2012 | Mucignat et al. | |
| 2013/0179107 A1 | 7/2013 | Setoguchi et al. | |
| 2013/0212416 A1 | 8/2013 | Crisan | |
| 2014/0028477 A1 | 1/2014 | Michalske | |
| 2014/0059365 A1 | 2/2014 | Heo et al. | |
| 2014/0232569 A1 | 8/2014 | Skinder et al. | |
| 2014/0232570 A1 | 8/2014 | Skinder et al. | |

FOREIGN PATENT DOCUMENTS

| | | |
|---|---|---|
| WO | 2013040493 A1 | 3/2013 |
| WO | 2014/035119 A2 | 3/2014 |

OTHER PUBLICATIONS

Beckler, "Accelerometer-Based Intertial Navigation," University of Minnesota Electrical and Computer Engineering Department, May 9, 2008, 17 pp.

Cochibo, "Arrow knows where you parked—Arrow Car Finder," Cochibo, Nov. 15, 2012, retrieved from <http:!/cochibo.com/arrow/>, 4 pp.

Cochibo, "Arrow knows where you parked—FAQ," Cochibo, Nov. 15, 2012, retrieved from <http://cochibo.com/arrow/faq/>, 2 pp.

Jophde, "Valet," Google Play, Apr. 3, 2014, retrieved from <https://play.google.com/store/apps/details?id=co.valetapp>, 3 pp.

Keyboard, "Auto-Finder—Android Apps on Google Play," Feb. 24, 2014, retrieved from, http://play.google.com/store/apps/details?id=com.keyboardr.parkingwithglass, 3 pp.

Khan et al., "A Feature Extraction Method for Realtime Human Activity Recognition on Cell Phones," Proc of International Symposium on Quality of Life Technology, 2011, 6 pp.

Khan et al., "A Triaxial Accelerometer-Based Physical-Activity Recognition view Augmented-Signal Features and a Hierarchical Recognizer," IEEE Transactions on Information Technology in Biomedicine, vol. 14, No. 5, Sep. 2010, pp. 1166-1172.

Khan, "Human Activity Recognition Using a Single Tri-axial Accelerometer," Kyung Hee University—Department of Computer Engineering, Feb. 2011, 160 pp.

Lee et al., "Activity and Location Recognition Using Wearable Sensors," Pervasive Computing, 2002, 9 pp.

Mannini et al., "Machine Learning Methods for Classifying Human Physical Activity from On-Body Accelerometers," MDPI—Open Access Sensors, Feb. 1, 2010, 22 pp.

Mathie, "Monitoring and Interpreting Human Movement Patterns Using a Triaxial Accelerometer," The University of New South Wales—Faculty of Engineering, Aug. 2003, 512 pp.

Subramanya et al., "Recognizing Activities and Spatial Context Using Wearable Sensors," Proc. of Conference on Uncertainty in AI (UAI), 2006, 10 pp.

Abbott et al., "Land-Vehicle Navigation Using GPS," Proceedings of the IEEE, vol. 87, No. 1, Jan. 1999, 18 pp.

Lipphardt, "MUG: Review of the 800si, Mike Lipphardt's Review of the 800si," retrieved from www.sds.com/mug/800si_review.html, accessed on Feb. 22, 2012, 6 pp.

Paek et al., "Energy-Efficient Rat-Adaptive GPS-based Positioning for Smartphones," Proceedings of the 8th international conference on Mobile Systems, applications and services, Jun. 15-18, 2010, 16 pp.

Wang et al., "A Framework of Energy Efficient Mobile Sensing for Automatic User State Recognition," Proc. 7th ACM MobiSys, Jun. 22-25, 2009, 13 pp.

Weston et al., "Modern inertial navigation technology and its application," Electronics & Communication Engineering Journal, Apr. 2000, 16 pp.

International Search Report and Written Opinion of international application PCT/US2015/011164, dated May 22, 2015, 16 pgs.

* cited by examiner

| State | Meaning | Processing | Transition | Power (mA) | Time (% of day) | Power impact (mA) |
|---|---|---|---|---|---|---|
| Device static horizontal | Device on a table | Accel looks for simple motion: -accel derivative high | Upon detection: Static horizontal to Tilt Detection | 0.1 | 60% | 0.06 |
| Static horizontal to tilt detection | User picks device up, and device starts to move. | Gyro and sensor hub turn on For 1 second, look for pitch/roll rotation and stabilization: - gyro stdev low - integral(gyro_x since motion started) > 10 degrees, or same for gyro_y - accel stdev somewhat low - \|accel_z\| < 1g * cos(10 degrees) - for 250ms | Upon detection: Wake up Upon detection timeout: Moving or not horizontal | 20 | 1% | 0.2 |
| Wake up | Screen turns on | None | Upon turn off: Moving or not horizontal | 0 | 9% | 0 |
| Moving or not horizontal | Device in a moving vehicle, or in bag, or in hand but not being used | Accel looks for stabilization: - accel stdev low - accel value close to 1g * z | Upon detection: Device Static horizontal | 0.1 | 10% | 0.01 |
| | In pocket, or in stationary bag | | | 0.1 | 20% | 0.02 |
| | | | | Total | 100% | 0.29 |

FIG. 7A

| State | Meaning | Processing | Transition | Power (mA) | Time (% of day) | Power impact (mA) |
|---|---|---|---|---|---|---|
| Device static | Device on a table or a stand | Accel looks for simple motion: - accel derivative high | Upon detection: Static to Tilt Detection | 0.1 | 76% | 0.08 |
| Static to tilt detection | User picks device up, and device starts to move. | Gyro and sensor hub turn on For 1 second, look for pitch/roll rotation and stabilization: - gyro stdev low - integral(gyro_x since motion started) > 10 degrees, or same for gyro_y - |accel_z| < 1g * cos(10 degrees) - accel stdev somewhat low - for 250ms | Upon detection: Wake up Upon detection timeout: Moving or not horizontal | 20 | 5% | 1 |
| Wake up | Screen turns on | None | Upon turn off: Moving or not horizontal | 0 | 9% | 0 |
| Moving or not horizontal | Device in a moving vehicle, bag, pocket, or hand but not being used | Accel looks for stabilization: - accel stdev low | Upon detection: Device Static | 0.1 | 10% | 0.01 |
| | | | | Total | 100% | 1.09 |

FIG. 7B

| State | Meaning | Processing | Transition | Power (mA) | Time (% of day) | Power impact (mA) |
|---|---|---|---|---|---|---|
| Device static, uncovered | Device on a table | Accel looks for simple motion: -accel derivative high | Upon detection: Static to Tilt Detection | 0.1 | 60% | 0.06 |
| Static to tilt detection | User picks device up, and device starts to move. | Gyro and sensor hub turn on For 1 second, look for pitch/roll rotation and stabilization: - gyro stdev low - integral(gyro_x since motion started) > 10 degrees, or same for gyro_y - accel stdev somewhat low - \|accel_z\| < 1g * cos(10 degrees) - proxy >10cm - for 250ms | Upon detection: Wake up Upon detection timeout: Moving or not horizontal Upon proxy < 10cm: Covered | 20 | 1% | 0.2 |
| Wake up | Screen turns on | None | Upon turn off: Moving or not horizontal | 0 | 9% | 0 |
| Moving, uncovered | Device in a moving vehicle or in hand but not being used | accel looks for stabilization: - accel stdev low - accel value close to 1g * z Every 1 second - verify proxy > 10cm | Upon detection: Device Static Upon proxy < 10 cm for 5 consecutive seconds: Covered | 1 | 10% | 0.1 |
| Covered | In pocket, or in bag | Monitor proximity sensor for uncovering - distance > 10cm - more than 2 seconds | Upon detection: Covered to static detection | 1 | 15% | 0.15 |
| Covered to static detection | User takes devices from bag | Gyro and sensor hub turn on For 2 seconds, look for stabilization: - gyro stdev low - accel stdev somewhat low - \|accel_z\| < 1g * cos(10 degrees) - for 250ms | Upon detection: wake up Upon detection timeout: Moving, uncovered | 20 | 5% | 1 |
| | | | | Total | 100% | 1.51 |

FIG. 7C

| State | Motion Module 6 | SCM 8 | Gyroscope of sensors 10 | UID 12 | Application Processors 14 |
|---|---|---|---|---|---|
| Device static, horizontal | On | Off | Off | Off | Off |
| Static horizontal to tilt detection | On | On | On | Off | Off |
| Wake up | Off | Off | Off | On | On |
| Moving or not horizontal | On | Off | Off | Off | Off |

FIG. 8A

| State | Motion Module 6 | SCM 8 | Gyroscope of sensors 10 | UID 12 | Application Processors 14 |
|---|---|---|---|---|---|
| Device static, horizontal | On | Off | Off | Off | Off |
| Static to tilt detection | On | On | On | Off | Off |
| Wake up | Off | Off | Off | On | On |
| Moving | On | Off | Off | Off | Off |

FIG. 8B

| State | Motion Module 6 | SCM 8 | Gyroscope of sensors 10 | Proximity sensor of sensors 10 | UID 12 | Application Processors 14 |
|---|---|---|---|---|---|---|
| Device static, uncovered | On | Off | Off | Off | Off | Off |
| Static to tilt detection | On | On | On | On | Off | Off |
| Wake up | Off | Off | Off | Off | On | On |
| Moving, uncovered | On | On | Off | On | Off | Off |
| Covered | On | On | Off | On | Off | Off |
| Covered to static detection | On | On | On | Off | Off | Off |

FIG. 8C

BUTTONLESS DISPLAY ACTIVATION

RELATED APPLICATION

This application claims the benefit of U.S. Provisional Application No. 61/934,153, filed Jan. 31, 2014, the entire content of which is hereby incorporated by reference.

BACKGROUND

Mobile computing devices provide the benefit of being portable while allowing a user to perform a variety of functions including various forms of communication and computing. For example, some mobile devices are capable of accessing the Internet, executing gaming applications, playing videos and music, as well as providing functionality of a traditional mobile, e.g. cellular, phone. Such devices are generally powered by a rechargeable battery. A persistent challenge in mobile device design is increasing the length of time the device may operate without recharging the battery.

Some computing devices may include a presence-sensitive display that detects user input and displays graphical content. One example of a presence-sensitive display may be a touchscreen that is physically integrated within a smartphone, tablet, or other computing device. While the presence-sensitive display is powered on, the computing device may receive indications of user input that are detected at the presence-sensitive display and output graphical content for display at the presence-sensitive display. Computing devices may include a physical button that, when depressed by a user, causes the computing device to power on and/or power off the presence-sensitive display. To conserve power, some computing devices may also automatically power off the presence-sensitive display after a defined time duration during which the presence-sensitive display does not detect user input.

While various options may exist to power off the presence-sensitive display, such as a physical power button and time-based automatic power off, fewer options are available to power on a presence-sensitive display. For instance, a user may need to locate and select a physical power button to power on the presence-sensitive display, which requires an additional user input before interacting with the presence-sensitive display. Alternatively, some computing devices may power on the presence-sensitive display in response to a change in motion of the computing device that was previously at rest. However, such techniques may produce false positives that power on the presence-sensitive display when not intended by the user, thereby decreasing battery life.

SUMMARY

In one example, a method includes determining, by a first motion module of a computing device and based on first motion data measured by a first motion sensor at a first time, that the mobile computing device has moved, wherein a presence-sensitive display operatively coupled to the computing device is deactivated at the first time, and, responsive to determining that the computing device has moved, activating a second, different, motion module. In this example, the method also includes determining, by the second motion module, second motion data measured by a second motion sensor, wherein determining the second motion data uses a greater quantity of power than determining the first motion data, and determining a first statistic of a group of statistics based at least on the second motion data. In this example, the method also includes responsive to determining that at least one of the group of statistics satisfies a threshold, activating the presence-sensitive display.

In another example, a computing device includes one or more processors, a plurality of sensors, and a first motion module that determines, based on first motion data measured by a first motion sensor of the plurality of sensors and at a first time, that the computing device has moved, wherein a presence-sensitive display is deactivated at the first time. In this example, the first motion module, responsive to determining that the mobile computing device has moved, activates a second, different motion module of the plurality of modules. In this example, the second motion module determines second motion data measured by a second motion sensor of the plurality of sensors, wherein determining the second motion data uses a greater quantity of power than determining the first motion data. In this example, the second motion module determines a first statistic of a group of statistics based at least on the second motion data. In this example, at least one of the one or more processors, responsive to determining that at least one statistic of the group of statistics satisfies a threshold, activates the presence-sensitive display.

In another example, a computing system includes a plurality of processors including: a first motion processor, a second motion processor, and an application processor. In this example, the computing system also includes a plurality of sensors, and a display. In this example, the computing system also includes at least one module executable by at least one of the plurality of processors to: determine, based on first motion data measured by a first motion sensor of the plurality of sensors and at a first time, that the computing device has moved, wherein the display is deactivated at the first time, responsive to determining that the computing device has moved, activate the second motion processor, determine, second motion data measured by a second motion sensor of the plurality of sensors, wherein determining the second motion data uses a greater quantity of power than determining the first motion data, determine a first statistic of a group of statistics based at least on the second motion data, and responsive to determining that at least one statistic of the group of statistics satisfies a threshold, activate the display.

In another example, a non-transitory computer-readable storage medium stores instructions that, when executed, cause a first motion processor of a plurality of processors of a mobile computing device to: determine, based on first motion data measured by a first motion sensor and at a first time, that the computing device has moved, wherein a presence-sensitive display is deactivated at the first time, responsive to determining that the mobile computing device has moved, activate a second motion processor of the plurality of processors. In this example, the non-transitory computer-readable storage medium further stores instructions that, when executed, cause the second motion processor of the plurality of processors to: determine, second motion data measured by a second motion sensor, wherein determining the second motion data uses a greater quantity of power than determining the first motion data, determine a first statistic of a group of statistics based at least on the second motion data, and responsive to determining that at least one statistic of the group of statistics satisfies a threshold, activate the presence-sensitive display. In this example, the plurality of processors further includes an application processor.

In another example, a non-transitory computer-readable storage medium stores instructions that, when executed, cause at least one of a plurality of processors of a computing device to: determine, by a first motion module based on first motion data measured by a first motion sensor and at a first time, that the mobile computing device has moved, wherein a presence-sensitive display is deactivated at the first time, responsive to determining that the computing device has moved, activate a second, different, motion module, determine, by the second motion module, second motion data measured by a second motion sensor, wherein determining the second motion data uses a greater quantity of power than determining the first motion data, determine, a first statistic of a group of statistics based at least on the second motion data, and responsive to determining that at least one statistic of the group of statistics satisfies a threshold, activate the presence-sensitive display.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIGS. 7A-7C are tables illustrating example states of a computing device to activate a display responsive to determining that a user is attempting to use the device, in accordance with one or more techniques of the present disclosure.

FIGS. 8A-8C are tables illustrating example power states of example components of a computing device to activate a display responsive to determining that a user is attempting to use the device, in accordance with one or more techniques of the present disclosure.

DETAILED DESCRIPTION

In general, techniques of the disclosure are directed to activating a display device of a computing device responsive to determining that a user is attempting to use the computing device. For instance, a presence-sensitive display of a computing device may initially be inactive (e.g., powered off). Responsive to determining that the computing device has moved based on first motion data measured by a first motion sensor (e.g., a low-power accelerometer), a first module of the computing device may cause a second, different, module of the computing device to activate. The second, different, module may be operatively coupled to a second sensor (e.g., a gyrometer). Responsive to determining second motion data measured by the second motion sensor, the second module of the computing device may cause the presence-sensitive display to activate. Determining the second motion data may use a greater quantity of power than determining the first motion data. Therefore, rather than activating the presence-sensitive display based on continuous monitoring performed by the second module and/or an application processor, each of which may have higher power consumption requirements than the first module, techniques of the disclosure may activate the second module and/or an application processor responsive to a preliminary determination of movement by the lower power consuming first module. In this way, as opposed to operating relatively higher power consuming devices (e.g., the second module and/or an application processor of the computing device), the computing device may activate the presence-sensitive display based on an initial determination by the lower power consuming first module.

As one example, a user may pick-up a computing device which may be in a low-power state (i.e., a display of the computing device may be off, and an application processor and/or a sensor control module of the device may be in a "sleep" mode). The user may desire to immediately interact with the computing device without providing additional user input, such as pushing a physical button. In accordance with one or more techniques of this disclosure, a computing device may activate a display responsive to determining, based on data measured by a plurality of sensors, that a user of the computing device is attempting to use the computing device.

Figure 1:
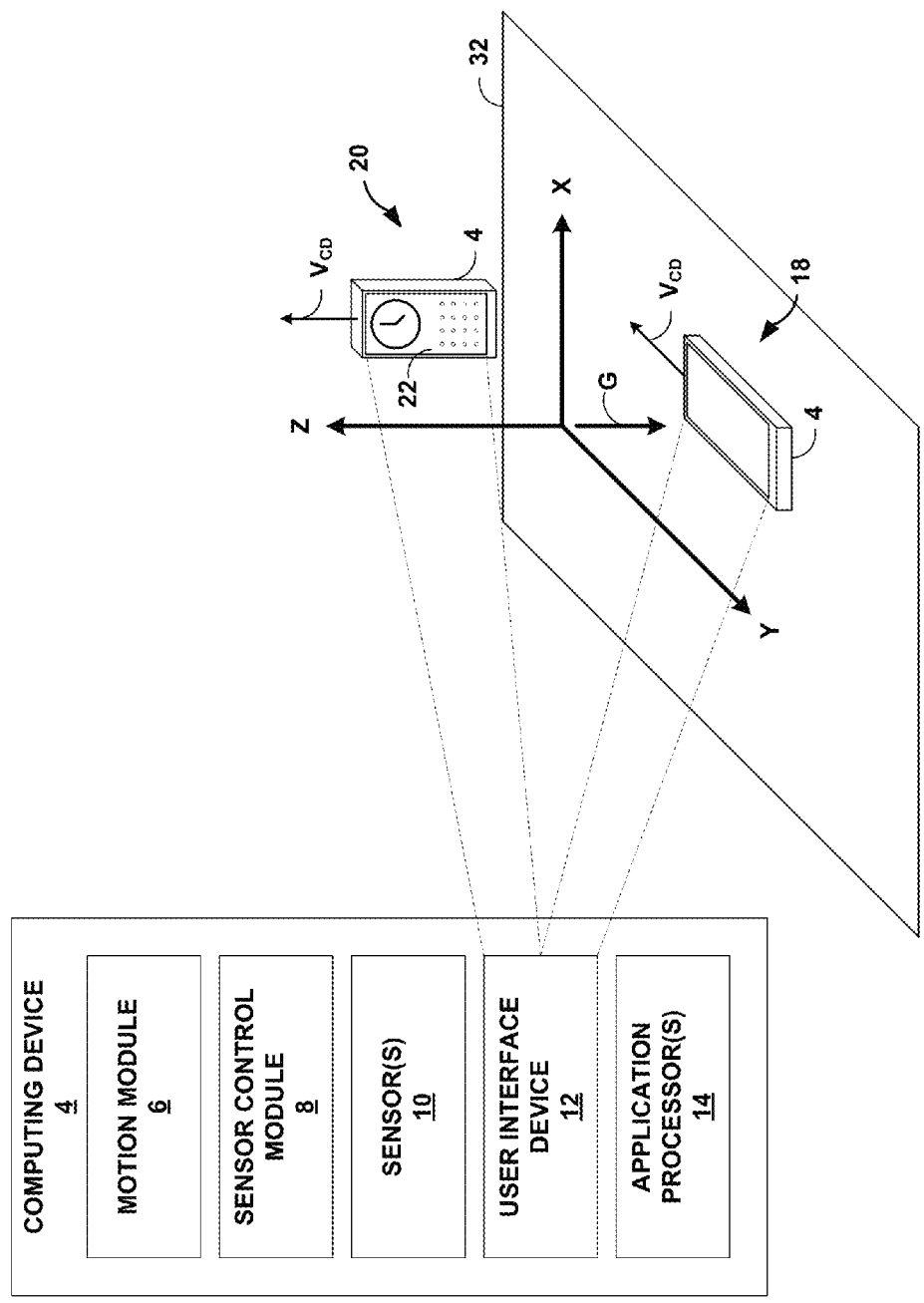
FIG. 1 is a block diagram illustrating an example computing device that is configured to activate a display responsive to determining that a user is attempting to use the device, in accordance with one or more techniques of the present disclosure.

FIG. 1 is a block diagram illustrating an example computing device that is configured to activate a display responsive to determining that a user is attempting to use the device, in accordance with one or more techniques of the present disclosure. As shown in the example of FIG. 1, computing device 4 may include motion module 6, sensor control module 8 ("SCM 8"), one or more sensors 10, user interface device 12 ("UID 12"), and one or more application processors 14.

Computing device 4 may include any number of different portable electronic mobile devices, including, e.g., cellular phones, personal digital assistants (PDAs), laptop computers, portable gaming devices, portable media players, e-book readers, watches, as well as non-portable devices such as desktop computers. Computing device 4 may include various input and output components, including, e.g. one or more processors, memory, telemetry modules, cellular network antennas, a display, one or more UI elements, sensors, and a power source like a rechargeable battery. Further details of mobile computing device 4 are described in FIG. 2.

Examples of computing device 4 may include, but are not limited to, portable or mobile devices such as mobile phones (including smart phones), tablet computers, cameras, personal digital assistants (PDAs), etc. Other examples of computing device 4 that implement techniques of this disclosure may include additional components not shown in FIG. 1.

In some examples, computing device 4 may include motion module 6. Motion module 6 may collect and analyze motion data corresponding to the movement of computing device 4. For instance, motion module 6 may determine whether or not computing device 4 has moved. In some examples, motion module 6 may determine whether or not computing device 4 has moved by analyzing first motion data received from a motion sensor included in motion module 6. In other words and as further illustrated in FIG. 2, motion module 6 may include a motion sensor to measure motion data (e.g., a motion sensor of sensors 10) and a processor to analyze the measured motion data. In some examples, motion module 6 may be a low power device. For instance, motion module 6 may use less power than sensor control module 8 and/or application processors 14. As one example, in operation, motion module 6 may use approximately 0.1 milliwatts (mW). In another example, motion module 6 may use power in a range of 0.01-3.0 mW. In some examples, motion module 6 may output a signal to one or more other components of computing device 4 in response to determining that computing device 4 has moved. For instance, motion module 6 may output an interrupt signal to SCM 8 in response to determining that computing device 4 has moved.

In some examples, computing device 4 may include SCM 8. SCM 8 may communicate with one or more of sensors 10 and/or motion module 6. In some examples, SCM 8 may be referred to as a "sensor hub" that operates as an input/output controller for one or more of sensors 10 and/or motion module 6. For example, SCM 8 may exchange data with one or more of sensors 10 and/or motion module 6, such as motion data corresponding to computing device 4. In some examples, SCM 8 may control the power state of one or more of sensors 10. For instance, SCM 8 may switch one or more of sensors 10 between an on power state and an off power state where more power is consumed by the one or more sensors 10 in the on power state than in the off power state. In this way, SCM 8 may control the amount of power consumed by one or more of sensors 10. SCM 8 may also communicate with application processors 14. In some examples, SCM 8 may use more power than motion module 6 but less power than application processors 14. As one example, in operation, SCM 8 may use power in a range of 20-200 mW.

SCM 8 may analyze data received from motion module 6 and/or one or more of sensors 10. SCM 8 may determine that a user of computing device 4 is attempting to use computing device 4 based on second motion data measured by one or more of sensors 10. For instance, SCM 8 may determine a statistic based on the second motion data. If the statistic satisfies a threshold, SCM 8 may determine that the user is attempting to use computing device 4. Responsive to determining that a user of computing device 4 is attempting to use computing device 4, SCM 8 may cause a display of UID 12 to activate.

In some examples, SCM 8 may receive one or more interrupt signals, for example, from motion module 6. In response to receiving an interrupt signal, SCM 8 may transition from a low-power or "sleep" state into one or more higher power states. SCM 8 may consume less power in the low-power state than in the higher power states.

In some examples, computing device 4 may include one or more sensors 10. One or more of sensors 10 may measure one more measurands. Examples of one or more of sensors 10 may include an accelerometer, a gyroscope, a light sensor, a temperature sensor, a pressure (or grip) sensor, a physical switch, a proximity sensor, or a button.

In some examples, computing device 4 may include UID 12. A user associated with computing device 4 may interact with computing device 4 by providing various user inputs into computing device 4, e.g., using the at least one UID 12. In some examples, UID 12 may receive tactile, audio, or visual input. In addition to receiving input from a user, UID 12 may output content, such as a graphical user interface (GUI) for display. In some examples, UID 12 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. That is, UID 12, in some examples may be a presence-sensitive display. In other examples, the display device can be physically separate from a presence-sensitive device included in computing device 4.

In some examples, computing device 4 may include one or more application processors 14. One or more application processors 14 may implement functionality and/or execute instructions within computing device 4. These instructions executed by application processors 14 may cause computing device 4 to read/write/etc. information during program execution. Examples of one or more of application processors 14 may include one or more microprocessors, digital signal processors (DSPs), application specific integrated circuits (ASICs), field programmable gate arrays (FPGAs), or any other equivalent integrated or discrete logic circuitry, as well as any combinations of such components.

The example of FIG. 1 illustrates a frame of reference in which the orientation of computing device 4 may be identified by relative terms, such as vertical and horizontal. In some examples according to this disclosure, the frame of reference in which a motion sensor determines the orientation of a computing device may differ from that shown in FIG. 1. However, the examples described below include motion sensors that determine orientations in a frame of reference in accordance with the example of FIG. 1. Thus, "vertical" and "horizontal" in such examples correspond to orientations that are treated as generally parallel to gravity and perpendicular to the ground and generally perpendicular to gravity and parallel to the ground, respectively. However, in practice, the orientation of computing device 4 may not be exactly or nearly exactly vertical or horizontal as represented by vector, $V_{CD}$, in orientations 18 and 20 in FIG. 1. Thus, FIG. 1 and the associated description provided below illustrate how the orientation of a computing device may be determined with one or more motion sensors when the computing device is only approximately vertical or horizontal, e.g. as defined in the example of FIG. 1, by employing a range of orientations within which the computing device's orientation vector as determined by the motion sensor may lie to designate the computing device in a particular orientation.

Rather than requiring a user of computing device 4 to provide additional input to activate a display of UID 12, techniques of this disclosure may enable computing device 4 to activate the display in response to determining that the user is attempting to use computing device 4. For instance, computing device 4 may determine that the user is attempting to use computing device 4 in response to motion data indicating that the user has picked-up computing device 4.

At a first time, computing device 4 may be in a first orientation. As illustrated by FIG. 1, computing device 4 may be in first orientation 18 in which computing device 4 may be horizontal. For instance, in first orientation 18, $V_{CD}$ may be perpendicular to gravity vector G, and UID 12 may be facing up. In some examples, first orientation 18 may be different than as illustrated in FIG. 1. For instance, UID 12 may be facing down. Additionally, at the first time, computing device 4 may be in a low-power state in which one or more components of computing device 4 may be off, deactivated, sleeping, have limited functionality, etc. For instance, at the first time, UID 12 may be deactivated, one or more of sensors 10 may be off, and SCM 8 and application processors 14 may be sleeping. In this way, computing device 4 may consume a reduced amount of power in the low-power state when compared to a normal operating state.

In any case, in an effort to interact with computing device 4, a user may pick-up computing device 4. For instance, the user may move computing device 4 from a first (e.g., orientation 18) to a second orientation (e.g., orientation 20). Motion module 6 may determine, based on first motion data measured by a first motion sensor of sensors 10, that computing device 4 has moved. For instance, where the first motion sensor includes an accelerometer, motion module 6 may determine that computing device 4 has moved if a rate of change (e.g., derivative) of the acceleration data measured by the accelerometer is greater than a threshold (e.g., 0.1 m/s$^2$-0.5 m/s$^2$). In other words, motion module 6 may determine that computing device 4 has moved in response to simple motion. In response to determining that computing device 4 has moved from the first orientation to the second orientation, motion module 6 may output a signal (e.g., an interrupt signal) to SCM 8.

Responsive to receiving the signal from motion module 6, SCM 8 may transition from a low-power state to a higher-power state. In other words, after receiving the signal from motion module 6, SCM 8 may begin to consume power at a higher rate than before receiving the signal. Additionally, in response to receiving the signal, SCM 8 may activate one or more additional sensors of sensors 10. For instance, SCM 8 may activate a gyroscope of sensors 10.

SCM 8 may determine that a user of computing device 4 is attempting to use computing device 4. In some examples, to determine whether or not the user is attempting to use computing device 4, SCM 8 may determine one or more statistics based on second motion data measured by one or more sensors of sensors 10. If at least one of the determined statistics satisfies a threshold, SCM 8 may determine that the user is attempting to use computing device 4. For example, SCM 8 may determine that the user of computing device 4 is attempting to use computing device 4 if a statistic based on a standard deviation of motion data measured by one or more of sensors 10 is less than a threshold. As another example, SCM 8 may determine that the user of computing device 4 is attempting to use computing device 4 if a statistic based on an integral or summation of motion data measured by one or more of sensors 10 is greater than a threshold. For instance, SCM 8 may determine that the user of computing device 4 is attempting to use computing device 4 if a statistic based on an integral of motion data measured by an x-axis or a y-axis gyroscope of sensors 10 is greater than 10 degrees. As another example, SCM 8 may determine that the user of computing device 4 is attempting to use computing device 4 if a statistic based on an absolute value of motion data measured by one or more of sensors 10 is greater than a threshold. For instance, SCM 8 may determine that the user of computing device 4 is attempting to use computing device 4 if a statistic based on an absolute value of motion data measured by an accelerometer of sensors 10 is greater than 10 degrees. In some examples, SCM 8 may base the statistic on motion data measured by one or more sensor of sensors 10 activated by SCM 8 in response to receiving the signal from motion module 6 and/or motion data measured by a sensor included in motion module 6. In some examples, SCM 8 may use multiple different statistics separately or in combination to determine whether or not a threshold is satisfied. In some examples, SCM 8 may weight and/or normalize one or more of the statistics. In some examples, if the threshold is not satisfied for the statistic (e.g., if SCM 8 does not determine that the user is attempting to use computing device 4) within a period of time after receiving the signal from motion module 6, SCM 8 may return to the low-power state.

Responsive to determining that the user of computing device 4 is attempting to use computing device 4, SCM 8 may output a signal to one or more other components of computing device 4. For example, SCM 8 may output a signal to one or more other components of computing device 4 that causes a display of UID 12 to activate. In this way, as opposed to requiring that the user of computing device 4 provide additional input, computing device 4 may activate a display in response to determining that the user is attempting to use computing device 4.

Figure 2:
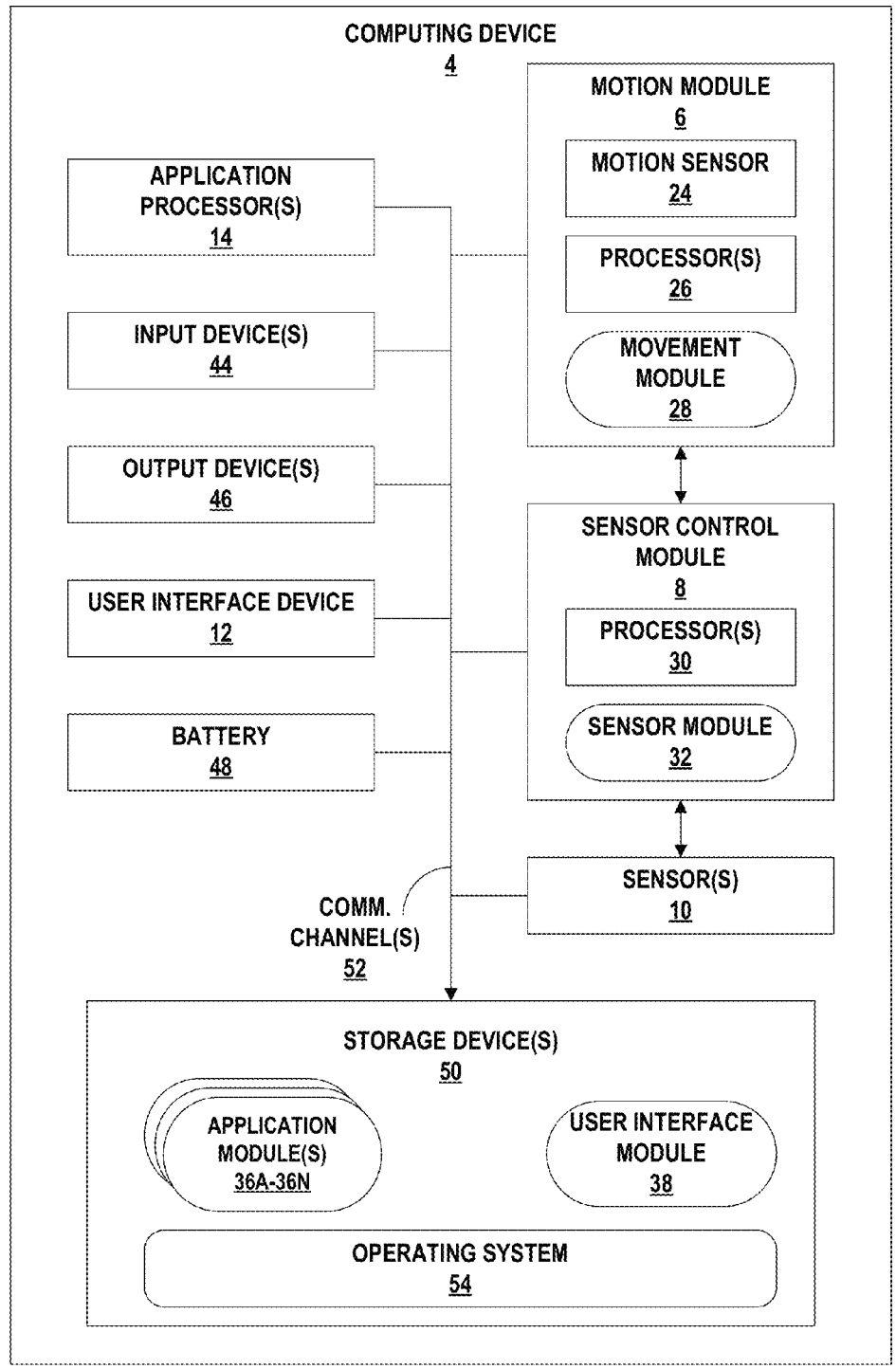
FIG. 2 is a block diagram illustrating an example computing device, in accordance with one or more techniques of the present disclosure.

FIG. 2 is a block diagram illustrating an example computing device, in accordance with one or more techniques of the present disclosure. FIG. 2 illustrates one particular example of computing device 4, and many other examples of computing device 4 may be used in other instances and may include a subset of the components included in example computing device 4 or may include additional components not shown in FIG. 2.

As shown in the example of FIG. 2, computing device 4 includes motion module 6, sensor control module 8 ("SCM 8"), one or more sensors 10, user interface device 12 ("UID 12"), one or more application processors 14, one or more input devices 44, one or more output devices 46, battery 48, and one or more storage devices 50. Storage devices 50 of computing device 4 may also include application modules 36A-36N (collectively, "application modules 36"), user interface module 38 ("UIM 38") and operating system 54. Computing device 4 can include additional components that, for clarity, are not shown in FIG. 2. For example, computing device 4 can include a communication unit to enable computing device 4 to communicate with other devices. Similarly, the components of computing device 4 shown in FIG. 2 may not be necessary in every example of computing device 4. For example, in some configurations, computing device 4 may not include output devices 46.

Communication channels 52 may interconnect each of the components 6, 8, 10, 12, 14, 44, 46, 48, and 50 for inter-component communications (physically, communicatively, and/or operatively). In some examples, communication channels 52 may include a system bus, a network connection, an inter-process communication data structure, or any other method and/or structure for communicating data.

One or more application processors 14 may implement functionality and/or execute instructions within computing device 4. For example, application processors 14 on computing device 4 may receive and execute instructions stored by storage devices 50 that execute the functionality of modules 36, and 54. These instructions executed by application processors 14 may cause computing device 4 to read/write/etc. information, such as one or more data files stored within storage devices 50 during program execution. Application processors 14 may execute instructions of modules 36, and 50 to cause UID 12 to output one or more graphical indications of incoming communications for display at UID 12 as content of a user interface. That is, application modules 36, UIM 38, and 54 may be operable by application processors 14 to perform various actions or functions of computing device 4, for instance, causing UID 12 to a present a graphical user interface at UID 12.

One or more input devices 44 of computing device 4 may receive input. Examples of input are tactile, audio, and video input. One or more of input devices 44 of computing device 4, in one example, may include a presence-sensitive display, touch-sensitive screen, mouse, keyboard, voice responsive system, video camera, microphone, or any other type of device for detecting input from a human or machine.

One or more output devices 46 of computing device 4 may generate output. Examples of output are tactile, audio, and video output. One or more of output devices 46 of computing device 4, in one example, may include a presence-sensitive display, sound card, video graphics adapter card, speaker, cathode ray tube (CRT) monitor, liquid crystal display (LCD), or any other type of device for generating output to a human or machine.

In some examples, UID 12 of computing device 4 may include functionality of input devices 44 and/or output devices 46. In the example of FIG. 2, UID 12 may be a presence-sensitive display. In some examples, a presence-sensitive display may include a presence sensitive input device that detects an object at and/or near a screen. As one example range, a presence-sensitive input device may detect an object, such as a finger or stylus that is within two inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive display also includes an output device that provides output to a user using tactile, audio, or video stimuli (e.g., the output device may be a display device) as described with respect to output device 46, e.g., at a display. In the example of FIG. 2, UID 12 may present one or more graphical user interfaces, such as graphical user interface 22 of FIG. 1.

While illustrated as an internal component of computing device 4, UID 12 also represents an external component that shares a data path with computing device 4 for transmitting and/or receiving input and output. For instance, in one example, UID 12 represents a built-in component of computing device 4 located within and physically connected to the external packaging of computing device 4 (e.g., a screen on a mobile phone). In another example, UID 12 represents an external component of computing device 4 located outside and physically separated from the packaging of computing device 4 (e.g., a monitor, a projector, etc. that shares a wired and/or wireless data path with a tablet computer).

Motion module 6 may collect and analyze motion data corresponding to the movement of computing device 4. For instance, motion module 6 may determine whether or not computing device 4 has moved. As illustrated in FIG. 2, motion module 6 may include motion sensor 24, one or more processors 26, and movement module 28. In some examples, motion module 6 may be a discrete component within computing device 4. In some examples, motion module 6 may be integrated into one or more other components of computing device 4, such as sensor control module 8. In some examples, motion module 6 may include additional components that, for simplicity, are not shown in FIG. 2. For instance, motion module 6 may include one or more analog-to-digital converters which may facilitate communication between motion sensor 24 and one or more of processors 26. Additionally, motion module 6 may include one or more storage devices which may store movement module 28.

Motion sensor 24 may measure motion information associated with computing device 4. For instance, motion sensor 24 may measure the rotation, velocity, and/or acceleration of computing device 4. Examples of one or more of motion sensor 24 may include an accelerometer, a gyroscope, or any other device capable of measuring the rotation, velocity, and/or acceleration of computing device 4. Motion sensor 24 may output measured motion data to one or more components of computing device 4, such as one or more of processors 26 and/or SCM 8.

Processors 26 may implement functionality and/or execute instructions within motion module 6. For example, one or more of processors 26 may receive and execute instructions stored by a storage device that execute the functionality of movement module 28. These instructions executed by one or more of processors 26 may cause motion module 6 to read/write/etc. information, such as one or more data files stored within a storage device during program execution. Examples of one or more of processors 26 may include one or more microprocessors, digital signal processors (DSPs), application specific integrated circuits (ASICs), field programmable gate arrays (FPGAs), or any other equivalent integrated or discrete logic circuitry, as well as any combinations of such components.

Movement module 28 may be executable by one or more of processors 26 to analyze motion data measured by motion sensor 24. For instance, movement module 28 may determine that computing device 4 has moved based on motion data measured by motion sensor 24. Movement module 28 may output a signal to one or more other components of computing device 4 in response to determining that computing device 4 has moved. For instance, movement module 28 may output an interrupt signal to SCM 8 in response to determining that computing device 4 has moved.

SCM 8 may collect and analyze sensor data. For instance, SCM 8 may collect any analyze sensor data from one or more of sensors 10 and/or motion sensor 24. As illustrated in FIG. 2, SCM 8 may include one or more processors 30, and sensor module 32. In some examples, SCM 8 may be a discrete component within computing device 4. In some examples, SCM 8 may be integrated into one or more other components of computing device 4, such as one or more of application processors 14. In some examples, SCM 8 may include additional components that, for simplicity, are not shown in FIG. 2. For instance, SCM 8 may include one or more analog-to-digital converters which may facilitate communication between one or more of sensors 10 and one or more of processors 30. Additionally, SCM 8 may include one or more storage devices which may store sensor module 32.

Processors 30 may implement functionality and/or execute instructions within SCM 8. For example, one or more of processors 30 may receive and execute instructions stored by a storage device that execute the functionality of sensor module 32. These instructions executed by one or more of processors 30 may cause SCM 8 to read/write/etc. information, such as one or more data files stored within a storage device during program execution.

SCM 8 may receive one or more interrupt signals. In response to receiving an interrupt signal, SCM 8 may transition from a low-power or "sleep" state into one or more higher power states. SCM 8 may consume less power in the low-power state than in the higher power states. For instance, SCM 8 may consume 0.1 mW of power in the low-power state, and between 20 mW and 200 mW of power in the higher power states. In some examples, in response to receiving an interrupt signal, one or more of processors 30 may execute sensor module 32.

Sensor module 32 may be executable by one or more of processors 30 to analyze sensor data measured by one or more of sensors 10 and/or motion sensor 24. For instance, sensor module 32 may determine one or more statistics based on sensor data measured by one or more of sensors 10 and/or motion sensor 24. If at least one of the statistics satisfies a threshold sensor module 32 may determine that a user of computing device 4 is attempting to use computing device 4. Sensor module 32 may output a signal to one or more other components of computing device 4 (e.g., in response to determining that a user is attempting to use computing device 4). For instance, sensor module 32 may output a signal to one or more components of computing device 4 that causes activation of a display of UID 12.

In some examples, sensor module 32 may control the power state of one or more of sensors 10. For instance, sensor module 32 may turn one or more of sensors 10 on and off. In this way, sensor module 32 may control the amount of power consumed by one or more of sensors 10. In one example, a gyroscope of sensors 10 may use approximately 10 mW when on. In another example, a gyroscope of sensors 10 may use between 1 mW and 50 mW when on.

Sensors 10 may collect information associated with computing device 4. For instance, one or more of sensors 10 may measure the geographical location, object clearance, rotation, velocity, and/or acceleration of computing device 4. Examples of one or more of sensors 10 may include an accelerometer, a gyroscope, a light sensor, a temperature sensor, a pressure (or grip) sensor, a physical switch, a proximity sensor, or a button. In some examples, one or more of sensors 10 may include one or more processors. For instance, one or more of sensors 10 may include one or more microprocessors, digital signal processors (DSPs), application specific integrated circuits (ASICs), field programmable gate arrays (FPGAs), or any other equivalent integrated or discrete logic circuitry, as well as any combinations of such components.

One or more storage devices 50 within computing device 4 may store information for processing during operation of computing device 4 (e.g., computing device 4 may store data that modules 36 and operating system 54 may access during execution at computing device 4). In some examples, storage device 50 is a temporary memory, meaning that a primary purpose of storage device 50 is not long-term storage. Storage devices 50 on computing device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also include one or more computer-readable storage media. Storage devices 50 may store larger amounts of information than volatile memory. Storage devices 50 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 50 may store program instructions and/or information (e.g., data) associated with application modules 36, UIM 38, and operating system 54.

Operating system 54, in some examples, controls the operation of components of computing device 4. For example, operating system 54, in one example, facilitates the communication of application modules 36 with application processors 14, one or more input devices 44, one or more output devices 46, UID 12, one or more sensors 10, motion module 6, and sensor control module 8. Each of application modules 36 may include program instructions and/or data that are executable by computing device 4 (e.g., by one or more application processors 14).

UIM 38 may cause UID 12 to output a graphical user interface (e.g., graphical user interfaces 20, 24) for display, which may enable a user of computing device 4 to view output and/or provide input at UID 12. UIM 38 and UID 12 may receive one or more indications of input from a user as the user interacts with the graphical user interface, at different times and when the user and computing device 4 are at different locations. UIM 38 and UID 12 may interpret inputs detected at UID 12 (e.g., as a user provides one or more gestures at one or more locations of UID 12 at which the graphical user interface is displayed) and may relay information about the inputs detected at UID 12 to one or more associated platforms, operating systems, applications, and/or services executing at computing device 4, to cause computing device 4 to perform functions.

UIM 38 may receive information and instructions from one or more associated platforms, operating systems, applications, and/or services executing at computing device 4 (e.g., application modules 36) for generating a graphical user interface. In addition, UIM 38 may act as an intermediary between the one or more associated platforms, operating systems, applications, and/or services executing at computing device 4 and various output devices of computing device 4 (e.g., speakers, LED indicators, audio or electrostatic haptic output device, etc.) to produce output (e.g., a graphic, a flash of light, a sound, a haptic response, etc.) with computing device 4.

Battery 48 may provide power to one or more components of computing device 4. Examples of battery 48 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. Battery 48 may have a limited capacity (e.g., 1000-3000 mAh).

Modules 28, 32, 36, and 38 may perform operations described herein using software, hardware, firmware, or a mixture of both hardware, software, and firmware residing in and executing on computing device 4. Computing device 4 may execute modules 28, 32, 36, and 38 with multiple processors. Computing device 4 may execute any of modules 28, 32, 36, and 38 as or within a virtual machine executing on underlying hardware. Modules 28, 32, 36, and 38 may be implemented in various ways. For example, any of modules 28, 32, 36, and 38 may be implemented as a downloadable or pre-installed application or "app." In another example, any of modules 28, 32, 36, and 38 may be implemented as part of an operating system of computing device 4.

Due to the limited capacity, the period of time for which computing device 4 may operate with power provided by battery 48 may be based on the amount of power consumed by computing device 4. As such, in order to increase the period of time for which computing device 4 may operate with power provided by battery 48, it may be desirable to reduce the amount of power consumed by computing device 4. As it may be undesirable to reduce performance while a user is interacting (i.e., using) computing device 4, it may be desirable to reduce the amount of power consumed by computing device 4 while not in use by the user.

In accordance with one or more techniques of this disclosure, rather than receiving specific input from a user of computing device 4 to activate a display, computing device 4 may activate the display in response to determining that the user is attempting to use computing device 4. For instance, computing device 4 may determine that the user is attempting to use computing device 4 in response to motion data indicating that the user has picked-up computing device 4.

At a first time, computing device 4 may be in a first orientation. For example, computing device 4 may be in a substantially horizontal orientation (i.e., as illustrated by first orientation 18 of FIG. 1), such as lying on a table or desk. As another example, computing device 4 may be on a user's person (e.g., in a pocket of a user and/or in a user's hand which may be at the user's side), in which case computing device 4 may be in a horizontal orientation, a vertical orientation, or some other orientation. Additionally, at the first time, computing device 4 may be in a low-power state in which one or more components of computing device 4 may be off, deactivated, sleeping, have limited functionality, etc. For instance, at the first time, a display of UID 12 may be deactivated, one or more of sensors 10 may be off, and SCM 8 and application processors 14 may be in a low-power or "sleep" state. In this way, computing device 4 may consume a reduced amount of power in the low-power state when compared to a normal operating state.

In any case, in an effort to interact with computing device 4, a user may pick-up computing device 4. For example, the user may pick-up computing device 4 from a table, remove computing device 4 from their pocket/bag, remove computing device 4 from a stand. In other words, the user may move computing device 4 from a first to a second orientation.

Prior to the first time, computing device 4 may be in a static operating state. In the static operating state, motion sensor 24 may provide motion data corresponding to the movement of computing device 4 to movement module 28. Based on the motion data received from sensor 24, movement module 28 may determine that, at the first time, computing device 4 has moved. For instance, movement module 28 may determine that computing device 4 has moved if the motion data received from motion sensor 24 indicates simple motion. For example, where the motion sensor 24 is an accelerometer, movement module 28 may determine that computing device 4 has moved if a derivative of the acceleration data measured by the accelerometer is greater than a threshold. In some examples, movement module 28 may determine that computing device 4 has moved from a first orientation to a second orientation. In some examples, movement module 28 may analyze one or more axes of motion data independently. For instance, movement module 28 may determine that a derivative of x-axis acceleration data is greater than a threshold.

In some examples, movement module 28 may analyze one or more axes of motion data as a group. For instance, movement module 28 may determine that a derivative of a combination of two or more axes acceleration data is greater than a threshold. In any case, responsive to determining that computing device 4 has moved, movement module 28 may output a signal (e.g., an interrupt signal) to SCM 8. In some examples, responsive to determining that computing device 4 has moved, computing device 4 may transition from the static operational state to a "static to tilt detection" operational state. In some examples, computing device 4 may transition from the static operational state to the static to tilt detection operational state where a user has picked-up computing device 4 and, as such, computing device 4 has started to move.

In the static to tilt detection operation state, computing device 4 may determine whether or not a user is attempting to use computing device 4. Responsive to receiving the signal from movement module 28, SCM 8 may transition from a low-power state to a higher-power state. For instance, responsive to receiving the signal from movement module 28, one or more of processors 30 may exit the "sleep" state and begin executing sensor module 32. Some example scenarios for the static to tilt detection operational state are where a user pick-up computing device 4 and therefore causes computing device 4 to move.

Sensor module 32 may activate one or more of sensors 10. For instance, sensor module 32 may activate a gyroscope of sensors 10. Sensor module 32 may determine whether or not a user of computing device 4 is attempting to use computing device 4. In some examples, to determine whether or not the user is attempting to use computing device 4, sensor module 32 may determine one or more statistics based on sensor data measured by one or more of sensors 10. For example, sensor module 32 may determine that the user of computing device 4 is attempting to use computing device 4 if a statistic based on a standard deviation of motion data measured by one or more of sensors 10 is less than a threshold.

As another example, sensor module 32 may determine that the user of computing device 4 is attempting to use computing device 4 if a statistic based on an integral of motion data measured by one or more of sensors 10 is greater than a threshold. For instance, sensor module 32 may determine that the user of computing device 4 is attempting to use computing device 4 if a statistic based on an integral of motion data measured by an x-axis and/or a y-axis gyroscope of sensors 10 is greater than 10 degrees. As another example, sensor module 32 may determine that the user of computing device 4 is attempting to use computing device 4 if a statistic based on an absolute value of motion data measured by one or more of sensors 10 (e.g., |accel_z|) is less than a threshold (e.g., 1 g*cos(X degrees), where X may be in the range of 5 to 30 degrees) for a period of time (e.g., 250 ms). For instance, sensor module 32 may determine that the user of computing device 4 is attempting to use computing device 4 if a statistic based on an absolute value of motion data measured by an accelerometer of sensors 10 is greater than 10 degrees. In some examples, sensor module 32 may determine that the user of computing device 4 is attempting to use computing device 4 if a statistic based on motion data measured by one or more of sensors 10 and/or motion sensor 24 indicates pitch/roll rotation and/or stabilization.

In some examples, sensor module 32 may base the determination on motion data measured by a sensor of sensors 10 activated by sensor module 32 in response to receiving the signal from movement module 28 and/or motion data measured by motion sensor 24. In some examples, if at least one of the statistics satisfies a threshold (i.e., if sensor module 32 determines that the user is attempting to use computing device 4) within a period of time (e.g., 1 second) after receiving the signal from movement module 28, sensor module 32 may cause device 4 to change operational states. For example, if sensor module 32 determines that at least one of the statistics satisfies a threshold within the period of time after receiving the signal from movement module 28, computing device 4 may enter a "wake-up" operational state.

In the wake-up operational state, movement module 28 may cause a display (e.g., a display of UID 12) to activate. In some examples, movement module 28 may cause the display to activate in a low-power state. For example, where the display includes a plurality of emissive elements (e.g., an organic light-emitting diode or "OLED" display) movement module 28 may cause the activation of fewer than all of the plurality of emissive elements. In some examples, movement module 28 may cause activation of all of the plurality of emissive elements. In some examples, UID 12 may be deactivated by turning off all of the emissive elements. In some examples, in the wake-up operational state, one or more of application processors 14 may exit a low-power or sleep power state. In some examples, responsive to receiving an indication of user input requesting that computing device 4 deactivate the display (e.g., the user pressed a sleep or off button), computing device 4 may re-enter the moving operational state. An example scenario for the wake-up operational state is when a user is interacting with a presence-sensitive display of computing device 4.

In some examples, if sensor module 32 does not determine that at least one statistic satisfies a threshold (i.e., if sensor module 32 does not determine that the user is attempting to use computing device 4) within a period of time after receiving the signal from movement module 28, sensor module 32 may cause device 4 to change operational states. For example, if sensor module 32 does not determine that the user is attempting to use computing device 4 within the period of time after receiving the signal from movement module 28, computing device 4 may determine that computing device 4 is static (e.g., that the orientation of computing device 4 has remained unchanged for a period of time) and may return to the static operational state. As another example, if sensor module 32 does not determine that at least one statistic satisfies a threshold within a period of time after receiving the signal from movement module 28, sensor module 32 may determine that computing device 4 is moving and enter a "moving" operational state. For instance, sensor module 32 may send a signal to movement module 28 that causes movement module 28 to enter the moving operational state.

In the moving operational state, movement module 28 may determine, based on motion data received from motion sensor 24, whether or not computing device 4 is stable. For instance, motion module 6 may determine that computing device 4 is stable if a standard deviation of motion data received from motion sensor 24 is below a threshold. Additionally, in some examples, such as where motion sensor 24 is an accelerometer, motion module 6 may determine that computing device 4 is stable if motion data received from motion sensor 24 indicates that computing device 4 is horizontal (i.e., whether or not the absolute value of an axis of the accelerometer perpendicular to the plane of the display is approximately one G). In some examples, responsive to determining that computing device 4 is stable, movement module 28 may cause computing device 4 to return to the static operational state (i.e., movement module 28 may resume analyzing motion data from motion sensor 24 to determine if computing device 4 has moved). In some examples, upon entering the moving operation state, SCM 8 may re-enter the low-power or sleep power state. In some examples, upon exiting the moving operation state, SCM 8 may re-enter the low-power or sleep power state. In some example scenarios for the moving operational state are where computing device 4 is in a moving vehicle, in a bag, or a user's hand but is not being used.

In some examples, in either the static to tilt detection operational state or the moving operational state, sensor module 32 may analyze proximity data measured by one or more of sensors 10 to determine whether or not an objected is less than a threshold distance (e.g., 10 cm) away from computing device 4. In some examples, sensor module 32 may determine the distance between computing device 4 and the object at a regular interval (e.g., 1 second). In some examples, responsive to determining the an object is less than the threshold distance away from computing device 4, sensor module 32 may enter a "covered" operational state. For instance, sensor module 32 may enter the covered operational state if the distance between computing device 4 and the object is less than the threshold for a period of time (e.g., 5 seconds).

In the covered operational state, sensor module 32 may determine whether or not computing device 4 is or becomes uncovered. For instance, sensor module 32 may determine that computing device 4 is uncovered if proximity data received from one or more of sensors 10 indicates that a distance between computing device 4 and an object is greater than a threshold distance (e.g., 10 cm). In some examples, sensor module 28 may be in a low-power state for a starting portion of the covered operational state, and wake-up in response to receiving an interrupt from one or more of sensors 10 that indicates that an object is greater than a threshold distance from computing device 4. In some examples, sensor module 32 may determine that computing device 4 is uncovered if proximity data received from one or more of sensors 10 indicates that a distance between computing device 4 and an object is greater than the threshold distance within a period of time of entering the covered operational state (e.g., 2 seconds). In some examples, responsive to determining that computing device 4 is covered after the period of time, sensor module 32 may cause computing device 4 to enter a "covered to static detection" operational state. Some example scenarios for the covered operational state are where computing device 4 is in a in a bag/pocket, and/or in a protective case/sleeve. By determining whether or not computing device 4 is covered, computing device 4 may avoid entering the wake-up operational state if there is something in front of computing device 4 (e.g., a cover, and/or the inside of a bag/pocket).

In some examples, sensor module 32 may utilize two or more proximity sensors of sensors 10 which may be located at different positions within computing device 4 to determine the distance between an object and computing device 4. For instance, a first proximity sensor may be positioned at a top-left corner of computing device 4 and a second proximity sensor may be positioned at a bottom-right corner of computing device 4. In this way, sensor module 32 may still be able to determine whether or not computing device 4 is covered even though one of the sensors may indicate a distance of approximately zero (e.g., where a hand of the user is obstructing the sensor).

In the covered to static detection operational state, sensor module 32 may determine whether or not a user is attempting to use computing device 4. In some examples, in the covered to static detection operational state, sensor module 32 may determine whether or not a user is attempting to use computing device 4 using similar techniques to the static to tilt detection operational state. For instance, sensor module 32 may determine that the user is attempting to use computing device 4 responsive to determining that at least one statistic satisfies a threshold. In some examples, some or all of the statistics and/or threshold values used by the covered to static detection operational state may be the same as the threshold values used by the static to tilt detection operational state. In some examples, some or all of the statistics and/or threshold values used by the covered to static detection operational state may be different than the threshold values used by the static to tilt detection operational state. In some examples, responsive to determining that at least one statistic satisfies a threshold, sensor module 32 may cause computing device 4 to enter the wake-up operational state. In some examples, responsive to not determining that at least one statistic satisfies a threshold within a period of time (e.g., 2 seconds), sensor module 32 may cause computing device 4 to enter the moving operational state. An example scenario for the covered to static detection operational state is when a user removes computing device 4 from a bag or a pocket.

In this way, sensor module 32 may reduce the likelihood of a false positive (i.e., where motion module 6 determines that computing device 4 is moving but SCM 8 determines that a user is not attempting to use computing device 4). For example, a false positive may be triggered when computing device 4 is in a moving vehicle. In such an example, computing device 4 may be moving relative to the outside, but static relative to the vehicle.

By reducing the number of false positives, the amount of power consumed by the display may be reduced which may extend the period of time which computing device 4 may be powered by battery 48. As discussed above, motion module 6 may consume significantly less power than SCM 8 and the second motion sensor of sensors 10. Therefore, by using motion module 6 to make the initial determination that computing device 4 is moving, and only then activating SCM 8 to confirm that the user is attempting to use computing device 4, the amount of power consumed by computing device 4 may be reduced which may extend the period of time which computing device 4 may be powered by battery 48.

Figure 3:
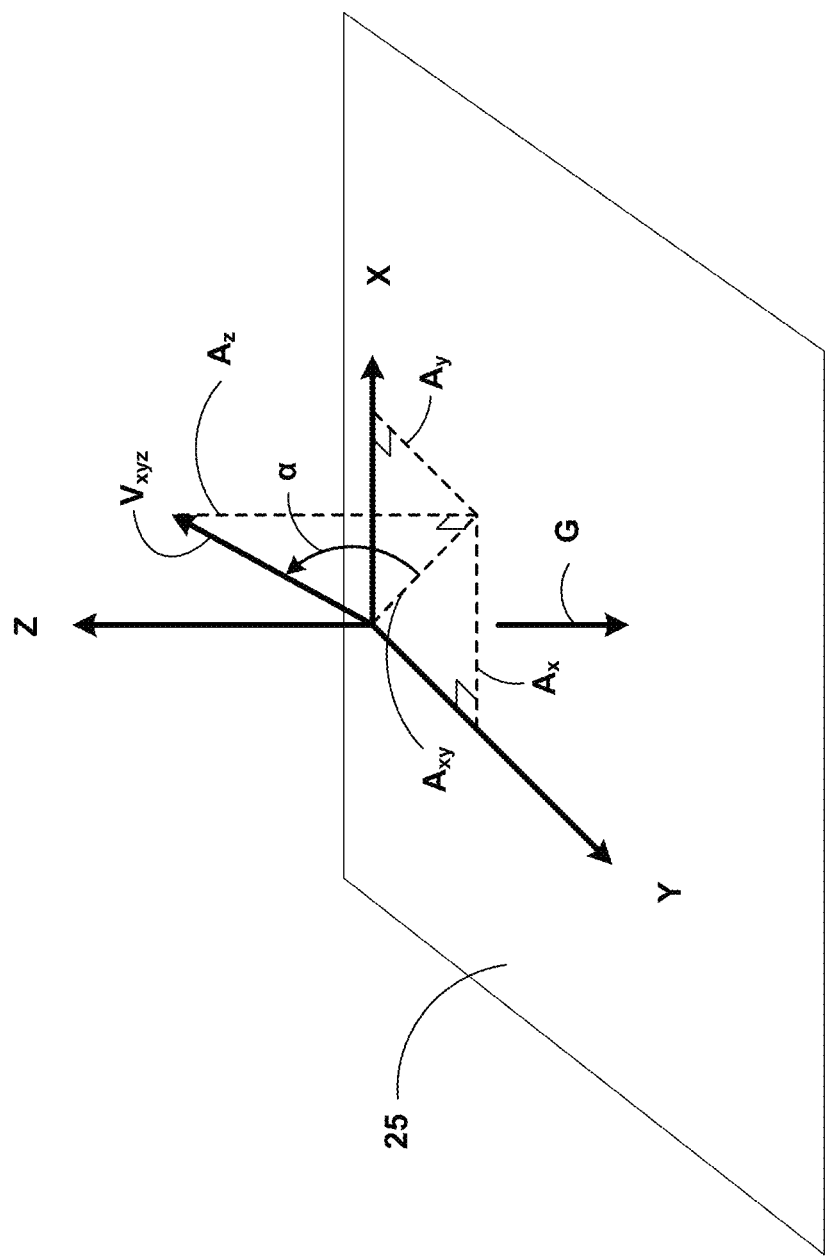
FIG. 3 illustrates an example orientation vector of a mobile device detected by a motion sensor, in accordance with one or more techniques of the present disclosure.

FIG. 3 illustrates an example orientation vector of a mobile device detected by a motion sensor, in accordance with one or more techniques of the present disclosure. As illustrated by FIG. 3, $V_{XYZ}$ may correspond to a vector which represents the orientation of a device, such as $V_{CD}$ of computing device 4 as illustrated in FIG. 1, in three dimensions.

The orientation of computing device 4, and, in particular, the vector, $V_{xyz}$ may be defined by the magnitudes of the vector in the X, Y, and Z directions $A_x$, $A_y$, and $A_z$, respectively, as well as the angles between the vector and each of the X, Y, and Z axes (not shown in FIG. 3). In some examples, one or more processors of computing device 4 may operate according to one or more techniques that approximate the orientation of computing device 4 as one of horizontal or vertical based on the angle, α, between the orientation vector, $V_{xyz}$, and the projection of the vector onto the horizontal X-Y plane.

For example, one or more of processors 26 and/or processors 30 may receive the magnitudes $A_x$, $A_y$, $A_z$ of vector, $V_{xyz}$ in the X, Y, Z directions from a motion sensor, such as motion sensor 24, respectively in the example of FIG. 3. One or more of processors 26 and/or processors 30 may then calculate the magnitude, $A_{xy}$, of the projection of vector, $V_{xyz}$ in the X-Y plane according to the following formula.

$$A_{xy} = \sqrt{A_x^2 + A_y^2} \quad (1)$$

One or more of processors 26 and/or processors 30 may then calculate the angle, α, between the orientation vector, $V_{xyz}$, and the projection of the vector onto the horizontal X-Y plane as a function of the arc tangent of the magnitude, $A_z$, of the vertical component of the orientation vector, $V_{xyz}$ and the magnitude, $A_{xy}$, of the projection of the vector in the X-Y plane. For example, one or more of processors 26 and/or processors 30 may calculate the angle, α, according to the following formula.

$$\alpha = \arctan\left(\frac{A_z}{A_{xy}}\right) \quad (2)$$

In one example, one or more of processors 26 and/or processors 30 may approximate the orientation of computing device 4 as vertical when the angle, α, between the orientation vector, $V_{xyz}$, and the projection of the vector onto the horizontal X-Y plane is greater than a threshold. In some examples, the threshold may be 10 degrees. In some examples, the threshold may be 50 degrees.

In accordance with or more techniques of this disclosure, one or more of processors 26 may determine, based on motion data measured by motion sensor 24, that computing device 4 has moved from a first orientation to a second, different orientation. For instance, one or more of processors 26 may determine the magnitude, $A_{xy}$, of the projection of vector, $V_{xyz}$ in accordance with formula (I), above, at a first time (resulting in $A_{xy1}$) and at a second time ($A_{xy2}$). In some examples, if the difference between $A_{xy1}$ and $A_{xy2}$ is greater than a threshold, one or more of processors 26 may determine that computing device 4 has moved.

Figure 4:
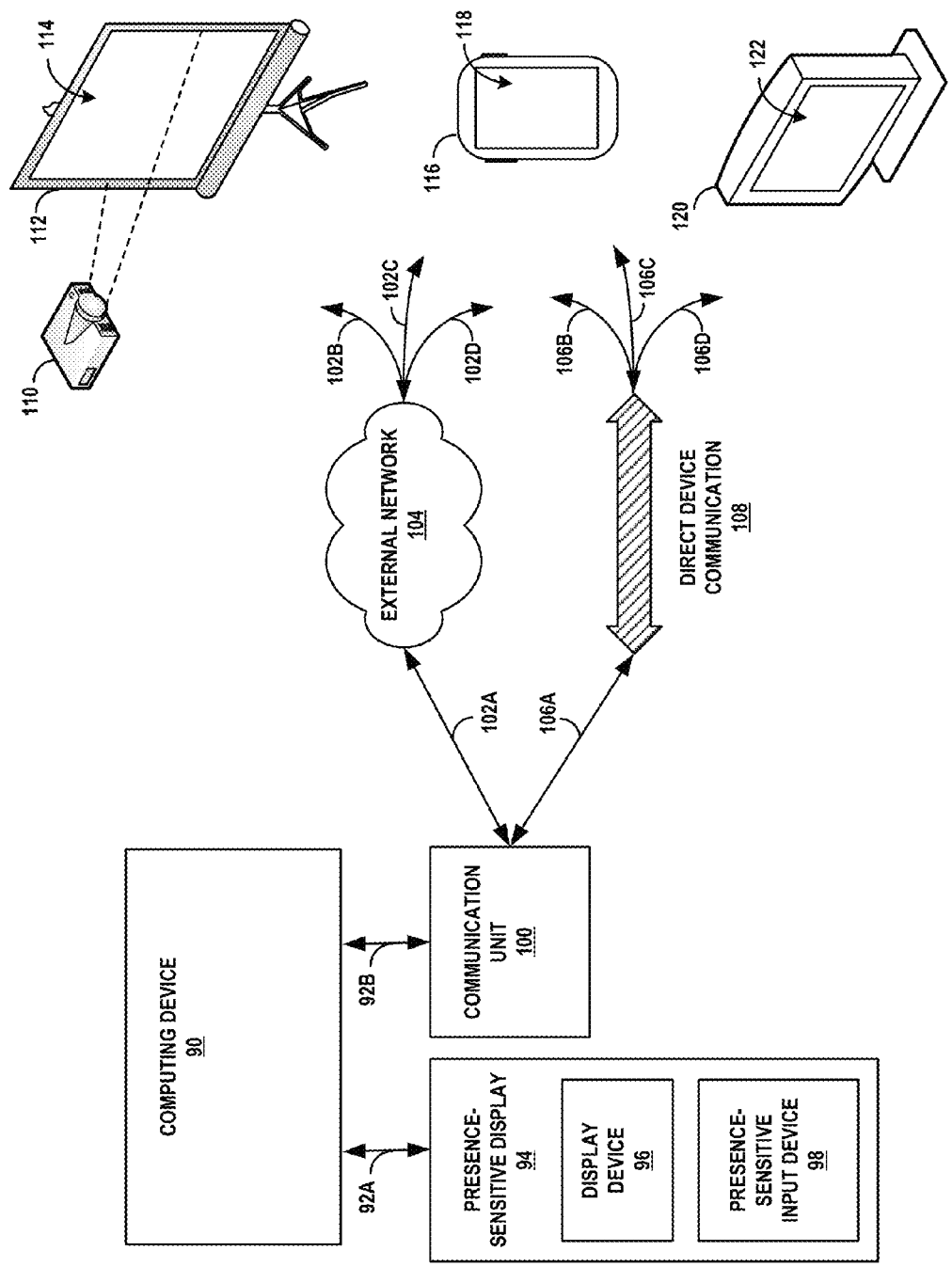
FIG. 4 is a block diagram illustrating an example computing device that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 90, presence-sensitive display 94, communication unit 100, projector 110, projector screen 112, mobile device 116, and visual display device 120. Although shown for purposes of example in FIGS. 1 and 2 as stand-alone computing device 4, a computing device, such as computing device 90 may, generally, be any component or system that includes a processor or other suitable computing environment for executing software instructions and, for example, need not include a presence-sensitive display.

As shown in the example of FIG. 4, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 4, computing device 90 may be operatively coupled to presence-sensitive display 94 and communication unit 100 by any number of one or more communication channels.

In other examples, such as illustrated previously by computing device 4 in FIGS. 1-2, a computing device may refer to a portable or mobile device such as mobile phones (including smart phones), wearable computing devices (including smart watches) laptop computers, etc. In some examples, a computing device may be a desktop computers, tablet computers, smart television platforms, cameras, personal digital assistants (PDAs), servers, mainframes, etc.

Presence-sensitive display 94, like UID 12 of FIG. 1, may include display device 96 and presence-sensitive input device 98. Display device 96 may, for example, receive data from computing device 90 and display the graphical content. In some examples, presence-sensitive input device 98 may determine one or more user inputs (e.g., continuous gestures, multi-touch gestures, single-touch gestures, etc.) at presence-sensitive display 94 using capacitive, inductive, and/or optical recognition techniques and send indications of such user input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 4, computing device 90 may also include and/or be operatively coupled with communication unit 100. Communication unit 100 may include functionality of communication unit 42 as described in FIG. 2. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 4 for purposes of brevity and illustration.

FIG. 4 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more user inputs (e.g., continuous gestures, multi-touch gestures, single-touch gestures, etc.) at projector screen using optical recognition or other suitable techniques and send indications of such user input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UID 10 as described in this disclosure. In some examples, presence-sensitive display 94 may include additional functionality. Projector screen 112 (e.g., an electronic whiteboard), may receive data from computing device 90 and display the graphical content. In some examples, presence-sensitive display 114 may determine one or more user inputs (e.g., continuous gestures, multi-touch gestures, single-touch gestures, etc.) at projector screen 112 using capacitive, inductive, and/or optical recognition techniques and send indications of such user input using one or more communication units to computing device 80.

FIG. 4 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, wearable computing devices, etc. Examples of visual display device 120 may include other semi-stationary devices such as televisions, computer monitors, etc. As shown in FIG. 4, mobile device 116 may include a presence-sensitive display 118. Visual display device 120 may include a presence-sensitive display 122. Presence-sensitive displays 118, 122 may include a subset of functionality or all of the functionality of UID 10 as described in this disclosure. In some examples, presence-sensitive displays 118, 122 may include additional functionality. In any case, presence-sensitive display 122, for example, may receive data from computing device 90 and display the graphical content. In some examples, presence-sensitive display 122 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 4 may be operatively coupled to network external network 104 by one of respective network links 102B, 102C, and 102D. External network 104 may include network hubs, network switches, network routers, etc., that are operatively inter-coupled thereby providing for the exchange of information between computing device 90 and the remote devices illustrated in FIG. 4. In some examples, network links 102A-102D may be Ethernet, ATM or other network connections. Such connections may be wireless and/or wired connections.

In some examples, computing device 90 may be operatively coupled to one or more of the remote devices included in FIG. 4 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 4 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In accordance with techniques of the disclosure, computing device 90 may be operatively coupled to visual display device 120 using external network 104. A first motion module of computing device 90 may determine, based on motion data measured by a first motion sensor, that computing device 90 has moved. Responsive to determining that computing device 90 has moved, the first motion module may activate a second, different motion module of computing device 90. The second motion module may determine, based on motion data measured by a second motion sensor, that a user is attempting to use computing device 90. Responsive to determining that that the user is attempting to use computing device 90, the second motion module may send a signal that causes one or more displays to activate. For example, the second motion module may send a signal that causes display device 96 of presence-sensitive display 94, projector 110, presence-sensitive display 118 of mobile device 116, and/or presence-sensitive display 122 of visual display device 120 to activate.

Figure 5:
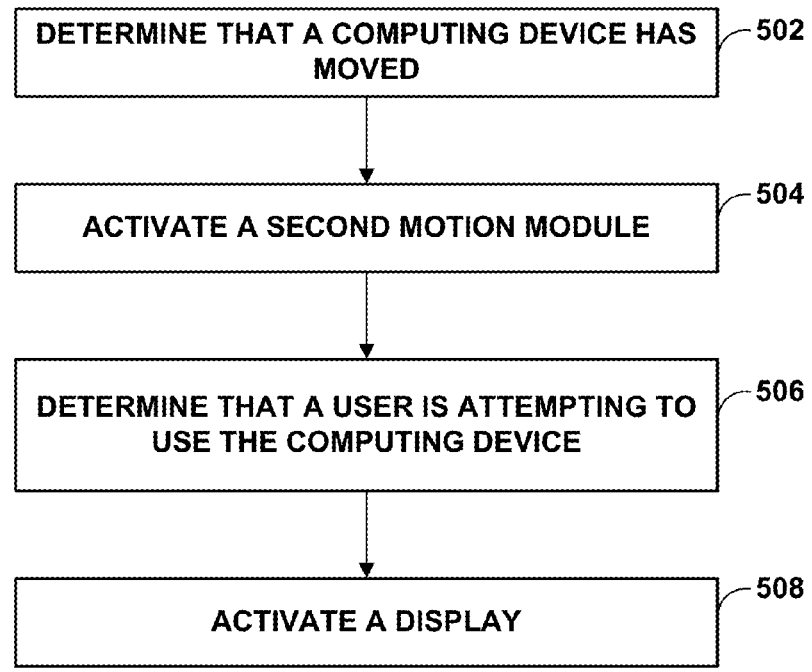
FIG. 5 is a flow diagram illustrating example operations of a computing device to activate a display responsive to determining that a user is attempting to use the device, in accordance with one or more techniques of the present disclosure.

FIG. 5 is a flow diagram illustrating example operations of a computing device to activate a display responsive to determining that a user is attempting to use the device, in accordance with one or more techniques of the present disclosure. The techniques of FIG. 5 may be performed by one or more processors of a computing device, such as computing device 4 illustrated in FIG. 1 and FIG. 2. For purposes of illustration, the techniques of FIG. 5 are described within the context of computing device 4 of FIG. 1 and FIG. 2, although computing devices having configurations different than that of computing device 4 may perform the techniques of FIG. 5.

In accordance with one or more techniques of the disclosure, movement module 28 of motion module 6 of computing device 4 may determine that computing device 4 has moved (502). As discussed above, at a first time, movement module 28 may determine that computing device 4 has moved based on motion data measured by a first motion sensor, which may be an accelerometer. Also, as discussed above, at or prior to the first time, computing device 4 may be in a low-power state in which a display is deactivated. Responsive to determining that computing device 4 has moved, movement module 28 may activate sensor control module 8 ("SCM 8") of computing device 4 (504). As discussed above, movement module 28 may activate SCM 8 by sending an interrupt to one or more of processors 30 of SCM 8.

Sensor module 32 of SCM 8 may determine that a user is attempting to use computing device 4 (506). As discussed above, sensor module 32 may determine that a user is attempting to use computing device 4 based on motion data measured by a second motion sensor. For instance, sensor module 32 may determine one or more statistics based on second motion data measured by the second motion sensor and determine that the user is attempting to use computing device 4 if at least one of the one or more statistics satisfies a threshold. Also as discussed above, responsive to becoming activated, sensor module 32 may activate the second motion sensor, which may be a gyroscope. Responsive to determining that the user is attempting to use computing device 4, sensor module 32 may activate a display (508).

FIGS. 6A-6G are flow diagrams illustrating example operations of a computing device to activate a display responsive to determining that a user is attempting to use the device, in accordance with one or more techniques of the present disclosure. The techniques of FIGS. 6A-6G may be performed by one or more processors of a computing device, such as computing device 4 illustrated in FIG. 1 and FIG. 2. For purposes of illustration, the techniques of FIGS. 6A-6G are described within the context of computing device 4 of FIG. 1 and FIG. 2, although computing devices having configurations different than that of computing device 4 may perform the techniques of FIGS. 6A-6G.

Figure 6A:
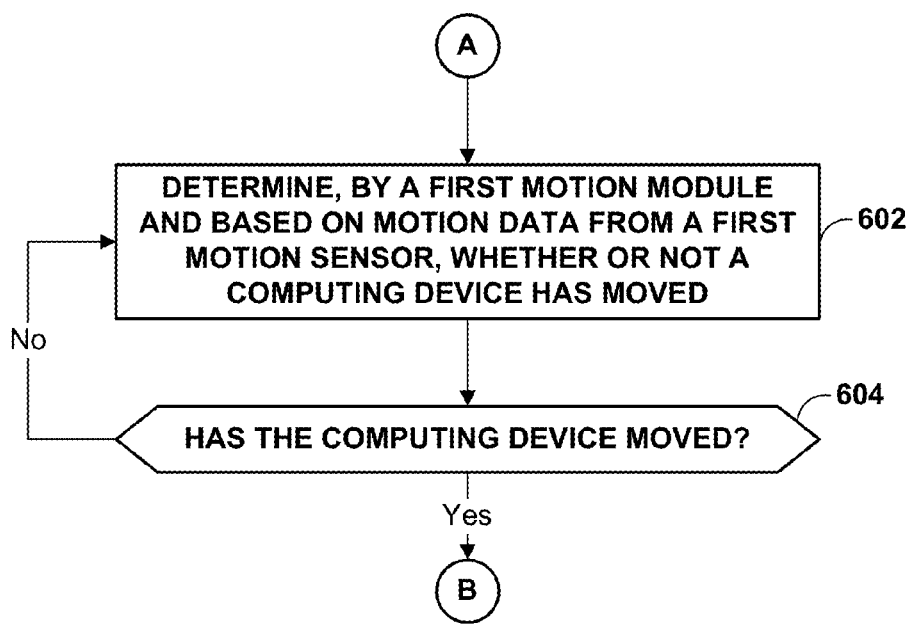
FIGS. 6A-6G are flow diagrams illustrating example operations of a computing device to activate a display responsive to determining that a user is attempting to use the device, in accordance with one or more techniques of the present disclosure.
Figure 6B:
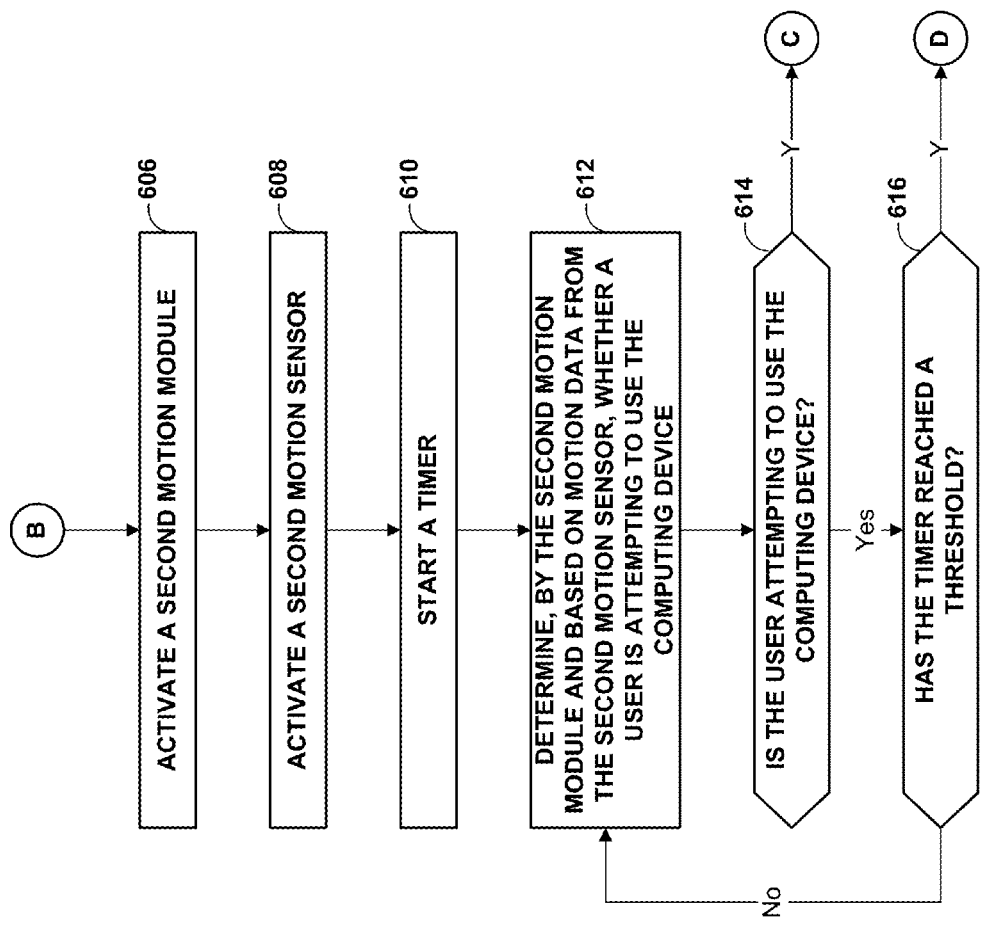
Figure 6C:
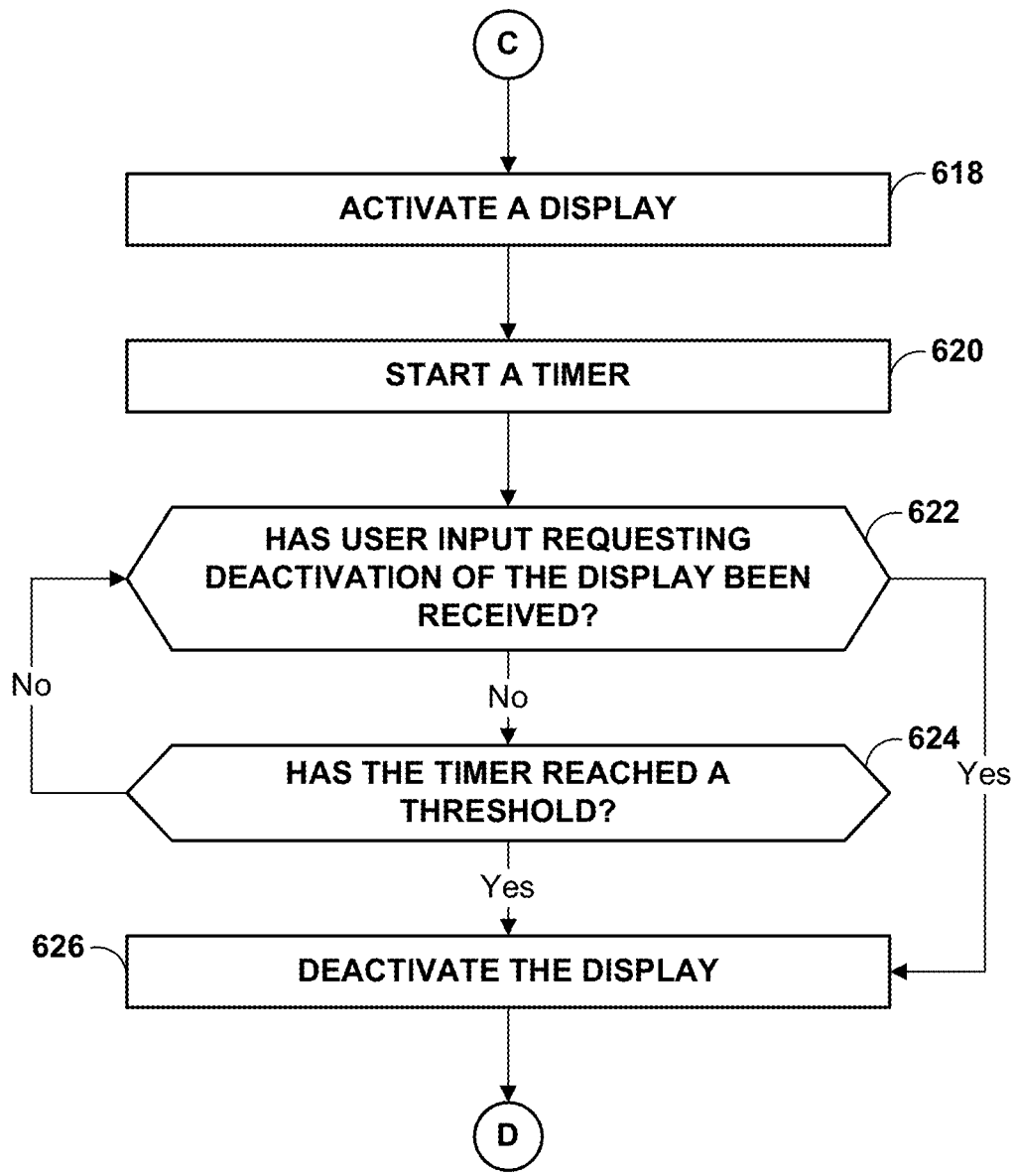
Figure 6D:
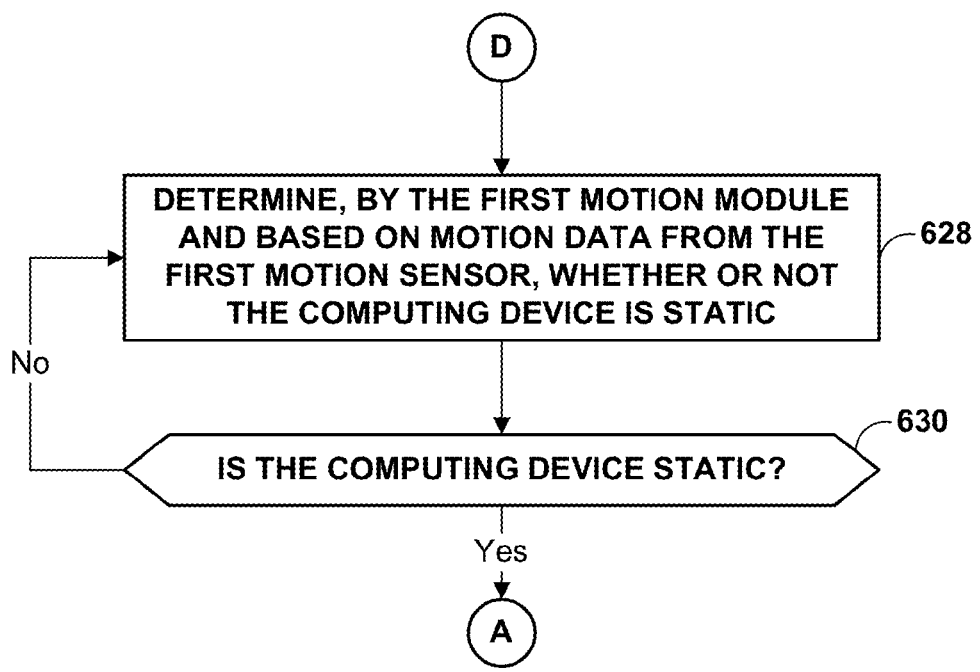
Figure 6E:
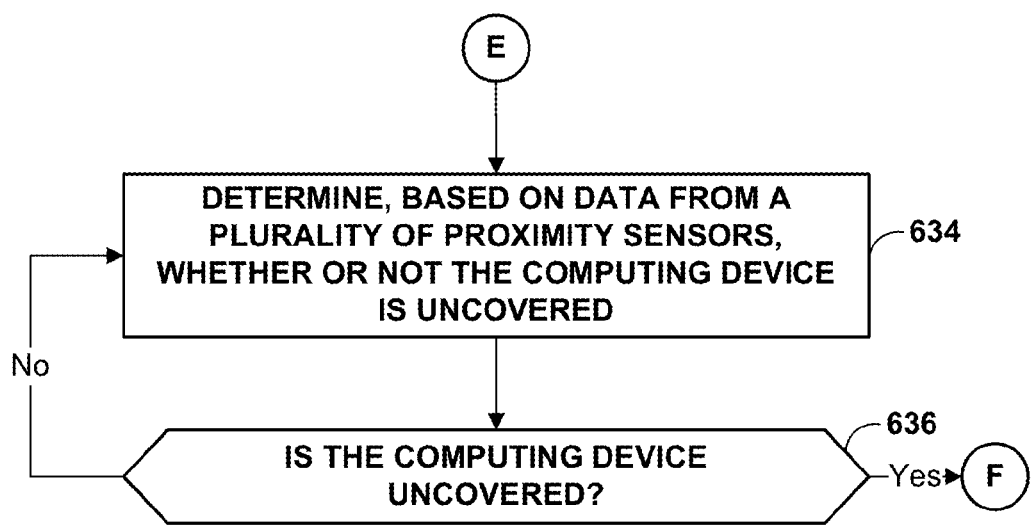
Figure 6F:
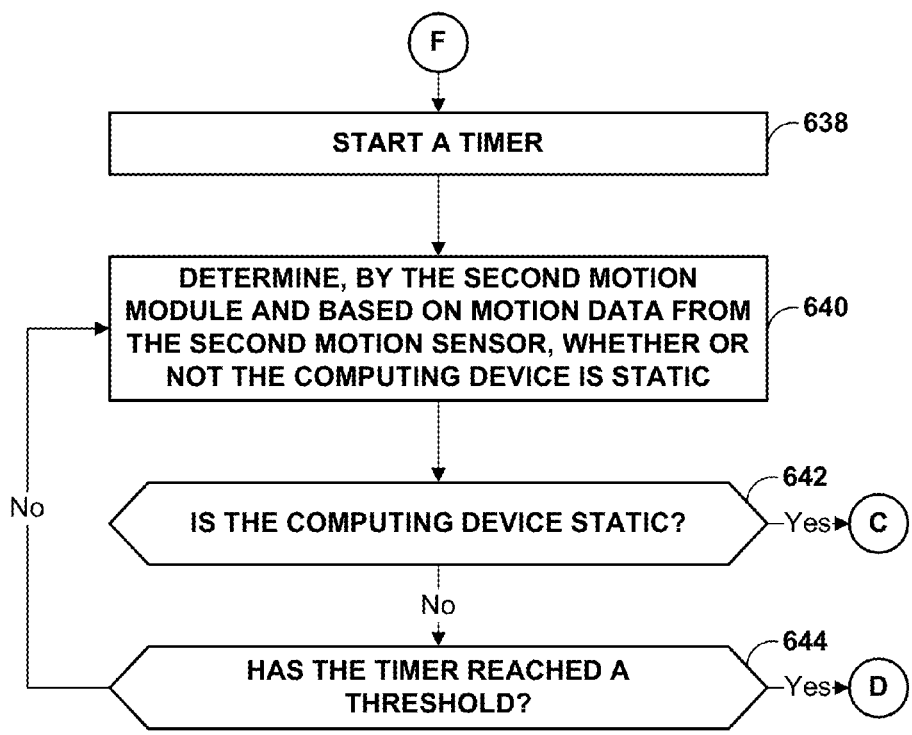
Figure 6G:
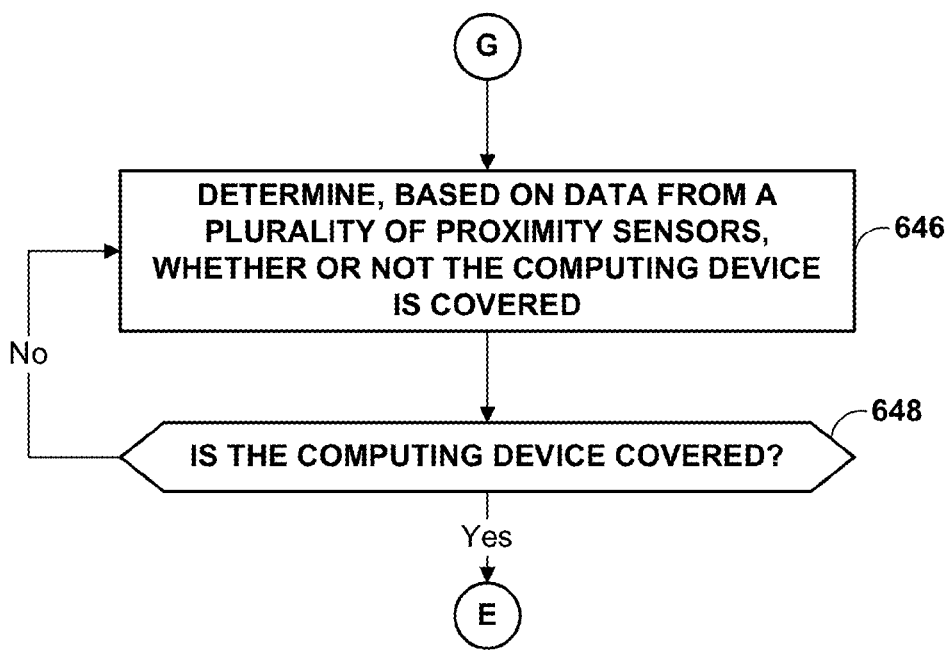

In some examples, computing device 4 may implement a finite-state machine. Each of FIGS. 6A-6G illustrates an example operating state. For instance, FIG. 6A illustrates an example "static" operating state, FIG. 6B illustrates an example "static to tilt detection" operational state, FIG. 6C illustrates an example "wake-up" operational state, FIG. 6D illustrates an example "moving" operational state, FIG. 6E illustrates an example "covered" operational state, FIG. 6F illustrates an example "covered to static detection" operational state, and FIG. 6G illustrates an example "covered detection" operational state.

In accordance with one or more techniques of the disclosure, FIG. 6A illustrates an example static operating state. In the example static operating state, movement module 28 of motion module 6 of computing device 4 may determine, based on motion data measured by motion sensor 24, whether or not computing device 4 has moved (602). If computing device 4 has not moved, movement module 28 may continue to analyze the motion data measured by motion sensor 24 to determine whether or not computing device 4 has moved ("Yes" branch of 604). If computing device 4 has moved, computing device 4 may transition into a static to tilt detection operational state, an example of which is illustrated by FIG. 6B ("No" branch of 604).

FIG. 6B illustrates an example static to tilt detection operational state. In the example static to tilt detection operational state, movement module 28 may activate sensor control module 8 ("SCM 8") of computing device 4 (606). Responsive to becoming active, sensor module 32 of SCM 8 may activate a second motion sensor of sensors 10 (608). Sensor module 32 may start a timer, which may have an initial value of zero (610). In some examples, as opposed to starting the timer, sensor module 32 may record a time stamp. Sensor module 32 may determine, based on motion data measured by the second motion sensor, whether or not a user is attempting to use computing device 4 (612). As discussed above, sensor module 32 may determine one or more statistics based on second motion data measured by the second motion sensor, and determine that the user is attempting to use computing device 4 if at least one of the one or more statistics satisfies a threshold.

If sensor module 32 determines that the user is attempting to use computing device 4, computing device 4 may transition into a wake-up operating state, an example of which is illustrated by FIG. 6C ("Yes" branch of 614). As discussed above, sensor module 32 may determine that the user is attempting to use computing device 4 if at least one statistic satisfies a threshold. If sensor module 32 does not determine that the user is attempting to use computing device 4, sensor module 32 may determine whether or not the timer has reached a threshold ("No" branch of 614). As discussed above, sensor module 32 may determine that the user is not attempting to use computing device 4 if at least one statistic does not satisfy a threshold. In some examples, sensor module 32 may determine that the timer has reached the threshold if a difference between a time stamp recorded during operation 610 and a time stamp recorded during operation 616 is greater than the threshold. If sensor module 32 determines that the timer has not reached the threshold, sensor module 32 may continue to analyze motion data measured by the second motion sensor to determine whether or not the user is attempting to use computing device 4 ("No" branch of 616). If sensor module 32 determines that the timer has reached the threshold, computing device 4 may transition into a moving operational state, an example of which is illustrated by FIG. 6D ("Yes" branch of 616).

In some examples, the static to tilt detection operational state may include the operations of a covered detection operational state, an example of which is illustrated by FIG. 6G. In examples, if the techniques of the static to tilt detection operational state result in an operational state transition prior to the techniques of the covered detection operational state, computing device 4 may transition into the operational state determined by the static to tilt detection operational state. In examples, if the techniques of the covered detection operational state result in an operational state transition prior to the techniques of the static to tilt detection operational state, computing device 4 may transition into the operational state determined by the covered detection operational state.

FIG. 6C illustrates an example wake-up operational state. In the example wake-up operational state, sensor module 32 may activate a display device (618). Sensor module 32 may start a timer, which may have an initial value of zero (620). In some examples, as opposed to starting the timer, sensor module 32 may record a time stamp. Sensor module 32 may determine whether or not user input requesting deactivation of the display has been received (622). If sensor module 32 determines that user input requesting deactivation of the display has been received, sensor module 32 may deactivate the display and computing device 4 may transition into the moving operational state ("Yes" branch of 622, 626). If sensor module 32 does not determine that user input requesting deactivation of the display has been received, sensor module 32 may determine whether or not the timer has reached a threshold ("No" branch of 622, 624).

In some examples, sensor module 32 may determine that the timer has reached the threshold if a difference between a time stamp recorded during operation 620 and a time stamp recorded during operation 624 is greater than the threshold. If sensor module 32 determines that the timer has not reached the threshold, sensor module 32 may continue to determine whether or not user input requesting deactivation of the display has been received ("No" branch of 624, 622). If sensor module 32 determines that the timer has reached the threshold, sensor module 32 may deactivate the display and computing device 4 may transition into a moving operational state, an example of which is illustrated by FIG. 6D ("Yes" branch of 624, 626).

FIG. 6D illustrates an example "moving" operational state. In the example moving operational state, movement module 28 may determine, based on motion data measured by motion sensor 24, whether or not computing device 4 is static (628). If movement module 28 does not determine that computing device 4 is static, movement module 28 may continue to analyze motion data measured by motion sensor 24 to determine whether or not computing device 4 is static ("No" branch of 630). If movement module 28 determines that computing device 4 is static, computing device 4 may transition into the static operating state, an example of which is illustrated by FIG. 6A ("Yes" branch of 630).

FIG. 6E illustrates an example covered operational state. In the example covered operational state, sensor module 28 may determine, based on data measured by a plurality of proximity sensors of sensors 10, whether or not computing device 4 is uncovered (634). If sensor module 28 does not determine that computing device 4 is uncovered, sensor module 28 may continue to analyze data measured by the plurality of proximity sensors of sensors 10 to determine whether or not computing device 4 becomes uncovered ("No" branch of 636, 634). If sensor module 28 determines that computing device 4 is uncovered, computing device 4 may transition into a covered to static detection operational state, an example of which is illustrated by FIG. 6F.

FIG. 6F illustrates an example covered to static detection operational state. In the example covered to static detection operational state, sensor module 32 may start a timer, which may have an initial value of zero (638). In some examples, as opposed to starting the timer, sensor module 32 may record a time stamp. Sensor module 32 may determine, based on motion data from the second motion sensor of sensors 10, whether or not computing device 4 is static (640). If sensor module 32 determines that computing device 4 is static, computing device 4 may transition into a wake-up operating state, an example of which is illustrated by FIG. 6C ("Yes" branch of 642). If sensor module 32 does not determine that computing device 4 is static, sensor module 32 may determine whether or not the timer has reached a threshold ("No" branch of 642, 644). In some examples, sensor module 32 may determine that the timer has reached the threshold if a difference between a time stamp recorded during operation 638 and a time stamp recorded during operation 644 is greater than the threshold. If sensor module 32 does not determine that the timer has reached the threshold, sensor module 32 may continue to analyze motion data measured by the second motion sensor of sensors 10 to determine whether or not computing device 4 is static ("No" branch of 644, 640). If sensor module 32 determines that the timer has reached the threshold, computing device 4 may transition into a moving operational state, an example of which is illustrated by FIG. 6D ("Yes" branch of 644).

FIG. 6G illustrates an example covered detection operational state. In the example covered detection operational state, sensor module 32 may determine, based on data measured by a plurality of proximity sensors of sensors 10, whether or not computing device 4 is covered (646). If sensor module 32 does not determine that computing device 4 is covered, sensor module 32 may continue to analyze data measured by the plurality of proximity sensors of sensors 10 to determine whether or not computing device 4 is covered ("No" branch of 648, 646). If sensor module 32 determines that computing device 4 is covered, computing device 4 may transition into a covered operational state, an example of which is illustrated by FIG. 6E ("Yes" branch of 648).

FIGS. 7A-7C are tables illustrating example states of a computing device to activate a display responsive to determining that a user is attempting to use the device, in accordance with one or more techniques of the present disclosure. As illustrated in each of FIGS. 7A-7C, a computing device, such as computing device 4 of FIG. 1, may implement one or more techniques of this disclosure in a finite state machine. Each of FIGS. 7A-7C illustrates a plurality of example operational states, and, for each of the example operational states, example meanings, example processing operations, example state transitions, example power usage, example time in which computing device 4 may operate in the state, and a corresponding power impact.

In some examples, the techniques illustrated by FIG. 7A may be combined with the techniques illustrated by FIG. 7B such that computing device 4 may determine when computing device 4 is static, and may be in a stand, by determining that an orientation of computing device 4 is either portrait (e.g., where a longer dimension of computing device 4 may be perceived as a height dimension) or landscape (e.g., where a longer dimension of computing device 4 may be perceived as a width dimension).

FIGS. 8A-8C are tables illustrating example power states of example components of a computing device to activate a display responsive to determining that a user is attempting to use the device, in accordance with one or more techniques of the present disclosure. The techniques of FIGS. 8A-8C may be performed by one or more processors of a computing device, such as computing device 4 illustrated in FIG. 1 and FIG. 2. For purposes of illustration, the techniques of FIGS. 8A-8C are described within the context of computing device 4 of FIG. 1 and FIG. 2, although computing devices having configurations different than that of computing device 4 may perform the techniques of FIGS. 8A-8C.

As discussed above with reference to FIG. 2, computing device 4 may include motion module 6, SCM 8, one or more sensors 10 (one or more of which may be a gyroscope and/or a proximity sensor), UID 12, and application processors 14. Also as discussed above, in some examples, computing device 4 may operate in a plurality of operational states. In some examples, the power states of one or more components of computing device 4 may vary depending on an operational state of computing device 4. FIGS. 8A-8C each illustrate an example relationship between power states of one or more components of computing device 4 and the example operational states of computing device 4, although other power state/operational state relationships are possible. For instance, in FIG. 8C, while SCM 8 is illustrated as on during the covered operational state, in some examples, SCM 8 may be off during the covered operational state or may only be on for a portion of the covered operational state.

In some examples, the one or more components may consume more power in their respective on power states than in their respective off power states. In some examples, in their respective off power states, the one or more components of computing device 4 may be in a low-power of sleep state, which may involve the consumption of some power. In some examples, in their respective off power states, the one or more components of computing device 4 may be completely off and consume no power.

Example 1

A method comprising: determining, by a first motion module of a computing device and based on first motion data measured by a first motion sensor at a first time, that the mobile computing device has moved, wherein a presence-sensitive display operatively coupled to the computing device is deactivated at the first time; responsive to determining that the computing device has moved, activating a second, different, motion module; determining, by the second motion module, second motion data measured by a second motion sensor, wherein determining the second motion data uses a greater quantity of power than determining the first motion data; determining a first statistic of a group of statistics based at least on the second motion data; and responsive to determining that at least one statistic of the group of statistics satisfies a threshold, activating the presence-sensitive display.

Example 2

The method of example 1, further comprising: determining third motion data measured by the first motion sensor, wherein determining the first statistic of the group of statistics comprises determining the first statistic of the group of statistics based on: the third motion data; and the second motion data.

Example 3

The method of any combination of examples 1-2, wherein the first statistic indicates whether or not the computing device moved from a first orientation to a second, different orientation.

Example 4

The method of any combination of examples 1-3, further comprising: determining, proximity data measured by one or more proximity sensors; and determining, based at least on the proximity data, a second statistic of the group of statistics.

Example 5

The method of any combination of examples 1-4, wherein determining, the proximity data measured by the one or more proximity sensors comprises: determining, first proximity data measured by a first proximity sensor of the one or more proximity sensors, wherein the first proximity sensor is positioned near a first corner of the computing device; and determining, second proximity data measured by a second proximity sensor of the one or more proximity sensors, wherein the second proximity sensor is positioned near a second corner of the computing device, and wherein the second corner is different than the first corner.

Example 6

The method of any combination of examples 1-5, wherein determining, the proximity data measured by the one or more proximity sensors comprises: determining, first proximity data measured by a first proximity sensor of the one or more proximity sensors, wherein the first proximity sensor is positioned on a first surface of the computing device; and determining, second proximity data measured by a second proximity sensor of the one or more proximity sensors, wherein the second proximity sensor is positioned on a second surface of the computing device, and wherein the second surface is different than the first surface.

Example 7

The method of any combination of examples 1-6, further comprising: responsive to determining, based on the proximity data, that an object is greater than a threshold distance from the computing device, activating the second motion module.

Example 8

The method of any combination of examples 1-7, further comprising: receiving, by the computing device, an indication of user input detected at an input device that switches the computing device to a low power state in which the presence-sensitive display is deactivated; responsive to receiving the indication of the user input that switches the computing device to the low power state, deactivating the presence-sensitive display; and determining, by the first motion module of the computing device and based on fourth motion data measured by the first sensor, that the computing device has not moved for a defined time duration.

Example 9

The method of any combination of examples 1-8, wherein the first motion module includes the first motion sensor and a first processor, wherein the second motion module includes a second processor, wherein the computing device includes an application processor, and wherein the first processor, the second processor, and the application processor are different, respective processors.

Example 10

The method of any combination of examples 1-9, wherein activating the second motion module comprises: sending, by the first processor and to the second processor, an interrupt; and activating, based at least in part on the interrupt, the second sensor.

Example 11

The method of any combination of examples 1-10, wherein the first sensor is an accelerometer and the second sensor is a gyroscope.

Example 12

The method of any combination of examples 1-11, wherein the presence-sensitive display comprises a plurality of emissive elements, and wherein activating the presence-sensitive display comprises at least one of: activating fewer than all of the plurality of emissive elements; and activating all of the plurality of emissive elements.

Example 13

A computing device comprising: one or more processors; a plurality of sensors; a first motion module that determines, based on first motion data measured by a first motion sensor of the plurality of sensors and at a first time, that the computing device has moved, wherein a presence-sensitive display is deactivated at the first time; and wherein the first motion module, responsive to determining that the mobile computing device has moved, activates a second, different motion module of the plurality of modules, wherein the second motion module determines second motion data measured by a second motion sensor of the plurality of sensors, wherein determining the second motion data uses a greater quantity of power than determining the first motion data; wherein the second motion module determines a first statistic of a group of statistics based at least on the second motion data; and wherein at least one of the one or more processors, responsive to determining that at least one statistic of the group of statistics satisfies a threshold, activates the presence-sensitive display.

Example 14

The computing device of example 13, wherein the first motion module determines third motion data measured by the first motion sensor, wherein the second motion module determines the first statistic based on: the third motion data; and the second motion data.

Example 15

The computing device of any combination of examples 13-14, wherein the second motion module determines proximity data measured by one or more proximity sensors, and wherein the second motion module determines a second statistic of the group of statistics based at least on the proximity data.

Example 16

The computing device of any combination of examples 13-15, wherein the first statistic indicates whether or not the computing device moved from a first orientation to a second, different orientation.

Example 17

The computing device of any combination of examples 13-16, wherein the proximity module determines the proximity data measured by the one or more proximity sensors by at least: determining, first proximity data measured by a first proximity sensor of the one or more proximity sensors, wherein the first proximity sensor is positioned near a first corner of the computing device; and determining, second proximity data measured by a second proximity sensor of the one or more proximity sensors, wherein the second proximity sensor is positioned near a second corner of the computing device, and wherein the second corner is different than the first corner.

Example 18

The computing device of any combination of examples 13-17, wherein the proximity module determines the proximity data measured by the one or more proximity sensors by at least: determining, first proximity data measured by a first proximity sensor of the one or more proximity sensors, wherein the first proximity sensor is positioned on a first surface of the computing device; and determining, second proximity data measured by a second proximity sensor of the one or more proximity sensors, wherein the second proximity sensor is positioned on a second surface of the computing device, and wherein the second surface is different than the first surface.

Example 19

The computing device of any combination of examples 13-18, wherein responsive to determining, based on the proximity data, that an object is greater than a threshold distance from the computing device, the proximity module activates the second motion module.

Example 20

The computing device of any combination of examples 13-19, further comprising: a user interface module that receives an indication of user input detected by an input device that switches the computing device to a low power state in which the presence-sensitive display is deactivated, wherein the user interface module, responsive to receiving the indication of the user input that switches the computing device to the low power state, deactivates the presence-sensitive display, and wherein the first motion module determines, based on fourth motion data measured by the first sensor, that the computing device has not moved for a defined time duration.

Example 21

The computing device of any combination of examples 13-20, wherein the first motion module is executable by a first processor of the plurality of processors, wherein the second motion module is executable by a second processor of the plurality of processors, and wherein the plurality of processors includes an application processor, and wherein the first processor, the second processor, and the application processor are different, respective processors.

Example 22

The computing device of any combination of examples 13-21, wherein the first motion module activates the second motion module by at least: sending, by the first processor and to the second processor, an interrupt, wherein, responsive to receiving the interrupt, the second processor activates the second sensor.

Example 23

The computing device of any combination of examples 13-22, wherein the first sensor is an accelerometer and the second sensor is a gyroscope.

Example 24

The computing device of any combination of examples 13-23, wherein the presence-sensitive display comprises a plurality of emissive elements, and wherein the second motion module activates the presence-sensitive display by either: activating fewer than all of the plurality of emissive elements; or activating all of the plurality of emissive elements.

Example 25

A computing system comprising: a plurality of processors including: a first motion processor; a second motion processor; and an application processor; a plurality of sensors; a display; and at least one module executable by at least one of the plurality of processors to: determine, based on first motion data measured by a first motion sensor of the plurality of sensors and at a first time, that the computing device has moved, wherein the display is deactivated at the first time; responsive to determining that the computing device has moved, activate the second motion processor; determine, second motion data measured by a second motion sensor of the plurality of sensors, wherein determining the second motion data uses a greater quantity of power than determining the first motion data; determine a first statistic of a group of statistics based at least on the second motion data; and responsive to determining that at least one statistic of the group of statistics satisfies a threshold, activate the display.

Example 26

The computing system of example 25, wherein the at least one module is executable by at least one of the plurality of processors to perform any combination of the techniques of examples 1-12.

Example 27

A non-transitory computer-readable storage medium storing instructions that, when executed, cause a first motion processor of a plurality of processors of a computing device to: determine, based on first motion data measured by a first motion sensor and at a first time, that the computing device has moved, wherein a presence-sensitive display is deactivated at the first time; responsive to determining that the mobile computing device has moved, activate a second motion processor of the plurality of processors, wherein the non-transitory computer-readable storage medium further stores instructions that, when executed, cause the second motion processor of the plurality of processors to: determine, second motion data measured by a second motion sensor, wherein determining the second motion data uses a greater quantity of power than determining the first motion data; determine a first statistic of a group of statistics based at least on the second motion data; and responsive to determining that at least one statistic of the group of statistics satisfies a threshold, activate the presence-sensitive display, wherein the plurality of processors further comprises an application processor.

Example 28

The non-transitory computer-readable storage medium of example 27, further storing instructions that, when executed, cause at least one of the plurality of processors to perform any combination of the techniques of examples 1-12.

Example 29

A non-transitory computer-readable storage medium storing instructions that, when executed, cause at least one of a plurality of processors of a computing device to: determine, by a first motion module based on first motion data measured by a first motion sensor and at a first time, that the mobile computing device has moved, wherein a presence-sensitive display is deactivated at the first time; responsive to determining that the computing device has moved, activate a second, different, motion module; determine, by the second motion module, second motion data measured by a second motion sensor, wherein determining the second motion data uses a greater quantity of power than determining the first motion data; determine, a first statistic of a group of statistics based at least on the second motion data; and responsive to determining that at least one statistic of the group of statistics satisfies a threshold, activate the presence-sensitive display.

Example 30

The non-transitory computer-readable storage medium of example 29, further storing instructions that, when executed, cause at least one of the plurality of processors to perform any combination of the techniques of examples 1-12.

Example 31

A device comprising means for performing any combination of the techniques of examples 1-12.

Example 32

A system comprising means for performing any combination of the techniques of examples 1-12.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
determining, by a first motion module of a computing device and based on first motion data measured by a first motion sensor at a first time, that the computing device has moved, wherein a presence-sensitive display operatively coupled to the computing device is deactivated at the first time;
responsive to determining that the computing device has moved, activating a second, different, motion module;
determining, by the second motion module, second motion data measured by a second motion sensor, wherein determining the second motion data uses a greater quantity of power than determining the first motion data;
determining a first statistic of a group of statistics based at least on the second motion data;
determining, by a proximity module of the computing device, proximity data measured by one or more proximity sensors;
determining, by the second motion module, a second statistic of the group of statistics based at least on the proximity data; and
responsive to determining that at least one statistic of the group of statistics satisfies a threshold, activating the presence-sensitive display.

2. The method of claim 1, further comprising:
determining third motion data measured by the first motion sensor,
wherein determining the first statistic of the group of statistics comprises determining the first statistic of the group of statistics based on:
the third motion data; and
the second motion data.

3. The method of claim 1, wherein the first statistic indicates whether or not the computing device moved from a first orientation to a second, different orientation.

4. The method of claim 1, wherein determining, the proximity data measured by the one or more proximity sensors comprises:
determining first proximity data measured by a first proximity sensor of the one or more proximity sensors, wherein the first proximity sensor is positioned near a first corner of the computing device; and
determining second proximity data measured by a second proximity sensor of the one or more proximity sensors, wherein the second proximity sensor is positioned near a second corner of the computing device, and wherein the second corner is different than the first corner.

5. The method of claim 1, wherein determining, the proximity data measured by the one or more proximity sensors comprises:
determining first proximity data measured by a first proximity sensor of the one or more proximity sensors, wherein the first proximity sensor is positioned on a first surface of the computing device; and
determining second proximity data measured by a second proximity sensor of the one or more proximity sensors, wherein the second proximity sensor is positioned on a second surface of the computing device, and wherein the second surface is different than the first surface.

6. The method of claim 5, wherein activating the second motion module comprises:
sending, by the first processor and to the second processor, an interrupt; and
activating, based at least in part on the interrupt, the second sensor.

7. The method of claim 1, further comprising:
responsive to determining, based on the proximity data, that an object is greater than a threshold distance from the computing device, activating the second motion sensor.

8. The method of claim 1, further comprising:
receiving, by the computing device, an indication of user input detected at an input device that switches the computing device to a low power state in which the presence-sensitive display is deactivated;
responsive to receiving the indication of the user input that switches the computing device to the low power state, deactivating the presence-sensitive display; and
determining, by the first motion module of the computing device and based on fourth motion data measured by the first sensor, that the computing device has not moved for a defined time duration.

9. The method of claim 1,
wherein the first motion module includes the first motion sensor and a first processor, wherein the second motion module includes a second processor,
wherein the computing device includes an application processor, and
wherein the first processor, the second processor, and the application processor are different, respective processors.

10. The method of claim 1, wherein the first sensor is an accelerometer and the second sensor is a gyroscope.

11. The method of claim 1, wherein the presence-sensitive display comprises a plurality of emissive elements, and wherein activating the presence-sensitive display comprises at least one of:
activating fewer than all of the plurality of emissive elements; and
activating all of the plurality of emissive elements.

12. A computing device comprising:
one or more processors;
a plurality of sensors;
a proximity module that determines proximity data measured by one or more proximity sensors; and
a first motion module that determines, based on first motion data measured by a first motion sensor of the plurality of sensors and at a first time, that the computing device has moved, wherein a presence-sensitive display is deactivated at the first time,
wherein the first motion module, responsive to determining that the computing device has moved, activates a second, different motion module,
wherein the second motion module determines second motion data measured by a second motion sensor of the plurality of sensors, wherein determining the second motion data uses a greater quantity of power than determining the first motion data,
wherein the second motion module determines a first statistic of a group of statistics based at least on the second motion data,
wherein the second motion module determines a second statistic of the group of statistics based at least on the proximity data, and
wherein at least one of the one or more processors, responsive to determining that at least one statistic of the group of statistics satisfies a threshold, activates the presence-sensitive display.

13. The computing device of claim 12,
wherein the first motion module determines third motion data measured by the first motion sensor,
wherein the second motion module determines the first statistic based on:
the third motion data; and
the second motion data.

14. The computing device of claim 12, wherein the first statistic indicates whether or not the computing device moved from a first orientation to a second, different orientation.

15. The computing device of claim 12, wherein the proximity module determines the proximity data measured by the one or more proximity sensors by at least:
determining first proximity data measured by a first proximity sensor of the one or more proximity sensors, wherein the first proximity sensor is positioned near a first corner of the computing device; and
determining second proximity data measured by a second proximity sensor of the one or more proximity sensors, wherein the second proximity sensor is positioned near a second corner of the computing device, and wherein the second corner is different than the first corner.

16. The computing device of claim 12, wherein the proximity module determines the proximity data measured by the one or more proximity sensors by at least:
determining first proximity data measured by a first proximity sensor of the one or more proximity sensors, wherein the first proximity sensor is positioned on a first surface of the computing device; and
determining second proximity data measured by a second proximity sensor of the one or more proximity sensors, wherein the second proximity sensor is positioned on a second surface of the computing device, and wherein the second surface is different than the first surface.

17. The computing device of claim 12, wherein responsive to determining, based on the proximity data, that an object is greater than a threshold distance from the computing device, the proximity module activates the second motion sensor.

18. The computing device of claim 12, further comprising:
a user interface module that receives an indication of user input detected by an input device that switches the computing device to a low power state in which the presence-sensitive display is deactivated,
wherein the user interface module, responsive to receiving the indication of the user input that switches the computing device to the low power state, deactivates the presence-sensitive display, and
wherein the first motion module determines, based on fourth motion data measured by the first sensor, that the computing device has not moved for a defined time duration.

19. The computing device of claim 12,
wherein the first motion module is executable by a first processor of the plurality of processors,
wherein the second motion module is executable by a second processor of the plurality of processors, and
wherein the plurality of processors includes an application processor, and wherein the first processor, the second processor, and the application processor are different, respective processors.

20. The computing device of claim 19,
wherein the first motion module activates the second motion module by at least:
sending, by the first processor and to the second processor, an interrupt,
wherein, responsive to receiving the interrupt, the second processor activates the second sensor.

21. The computing device of claim 12, wherein the first sensor is an accelerometer and the second sensor is a gyroscope.

22. The computing device of claim 12,
wherein the presence-sensitive display comprises a plurality of emissive elements, and
wherein the second motion module activates the presence-sensitive display by either:
activating fewer than all of the plurality of emissive elements; or
activating all of the plurality of emissive elements.

23. A non-transitory computer-readable storage medium storing instructions that, when executed, cause at least one of a plurality of processors of a computing device to:
determine, by a first motion module and based on first motion data measured by a first motion sensor and at a first time, that the computing device has moved, wherein a presence-sensitive display is deactivated at the first time;
responsive to determining that the computing device has moved, activate a second, different, motion module;
determine, by the second motion module, second motion data measured by a second motion sensor, wherein determining the second motion data uses a greater quantity of power than determining the first motion data;
determine, a first statistic of a group of statistics based at least on the second motion data;
determine, by a proximity module, proximity data measured by one or more proximity sensors;

determine, by the second motion module, a second statistic of the group of statistics based at least on the proximity data; and responsive to determining that at least one statistic of the group of statistics satisfies a threshold, activate the presence-sensitive display.

24. The non-transitory computer-readable storage medium of claim 23, further comprising instructions that, when executed, cause at least one of the plurality of processors to:

determine third motion data measured by the first motion sensor, wherein the instructions cause the at least one of the plurality of processors to determine the first statistic of the group of statistics based on:
the third motion data; and
the second motion data.

25. The non-transitory computer-readable storage medium of claim 23, wherein the instructions that cause the at least one of the plurality of processors to determine the proximity data measured by the one or more proximity sensors comprise instructions that cause the at least one of the plurality of processors to:

determine first proximity data measured by a first proximity sensor of the one or more proximity sensors, wherein the first proximity sensor is positioned near a first corner of the computing device; and determine second proximity data measured by a second proximity sensor of the one or more proximity sensors, wherein the second proximity sensor is positioned near a second corner of the computing device, and wherein the second corner is different than the first corner.

26. The non-transitory computer-readable storage medium of claim 23, wherein the instructions that cause the at least one of the plurality of processors to determine the proximity data measured by the one or more proximity sensors comprise instructions that cause the at least one of the plurality of processors to:

determine first proximity data measured by a first proximity sensor of the one or more proximity sensors, wherein the first proximity sensor is positioned on a first surface of the computing device; and determine second proximity data measured by a second proximity sensor of the one or more proximity sensors, wherein the second proximity sensor is positioned on a second surface of the computing device, and wherein the second surface is different than the first surface.

27. The non-transitory computer-readable storage medium of claim 23, further comprising instructions that, when executed, cause at least one of the plurality of processors to:

responsive to determining, based on the proximity data, that an object is greater than a threshold distance from the computing device, activate the second motion sensor.

* * * * *